United States Patent [19]
Tachihara et al.

[11] Patent Number: 5,633,728
[45] Date of Patent: May 27, 1997

[54] IMAGE PROCESSING METHOD

[75] Inventors: Masayoshi Tachihara, Chofu; Akira Asai, Atsugi, both of Japan

[73] Assignee: Canon Kabushiki Kaisha, Tokyo, Japan

[21] Appl. No.: 534,163

[22] Filed: Sep. 26, 1995

Related U.S. Application Data

[63] Continuation of Ser. No. 169,528, Dec. 20, 1993, abandoned.

[30] Foreign Application Priority Data

Dec. 24, 1992 [JP] Japan ................................. 4-359277
Nov. 30, 1993 [JP] Japan ................................. 5-300305

[51] Int. Cl.$^6$ ........................... H04N 1/407; H04N 1/41; H04N 7/12
[52] U.S. Cl. .................. 358/429; 358/455; 348/402; 348/413; 348/416; 382/236; 382/237
[58] Field of Search ........................... 358/426, 429, 358/430, 433, 447, 455; 348/402, 401, 413, 412, 416, 415, 407, 432, 390, 384; 382/236, 237, 238, 239

[56] References Cited

U.S. PATENT DOCUMENTS

| | | | |
|---|---|---|---|
| 4,649,422 | 3/1987 | Rauskolb et al. | 358/447 |
| 5,121,191 | 6/1992 | Cassereau et al. | 358/441 |
| 5,305,115 | 4/1994 | Takahashi et al. | 358/390 |

OTHER PUBLICATIONS

IEEE Journal on Selected Areas in Communications, vol. 10, No. 1, Jan. 1992, pp. 97–121, With et al., "Data Compression Systems for Home–Use Digital Video Recording".

Eighth International Conference on Video, Audio and Data Recording, Apr. 24, 1990, pp. 144–150, Kondo et al., "New ADRC for Consumer Digital VCR".

*Primary Examiner*—Scott A. Rogers
*Attorney, Agent, or Firm*—Fitzpatrick, Cella, Harper & Scinto

[57] ABSTRACT

A method of recording (preserving) and reproducing an image is disclosed. The x and y axes are assumed on the plane of an original image, the z axis (density axis) is assumed to be perpendicular to the x and y axes, and a space defined by the x, y, and z axes is divided into rectangular solid cells. The volume ratio below a density distribution curved surface of the volume of each rectangular solid is recorded. Upon reproduction, the curved surface is reproduced based on the volume ratios of the rectangular solids which the density distribution curved surface crosses, and those of rectangular solids adjacent thereto.

In a four-dimensional Euclidean space defined by an image plane (x,y), a density or brightness D, and time or a frame f, an image is expressed by a solid in this space. This space is divided into four-dimensional rectangular solids, and an amount proportional to the volume of the solid in each rectangular solid is recorded or transmitted. Upon reproduction, the solid is reproduced based on the volume amounts of the rectangular solids and those of rectangular solids adjacent thereto, thereby reproducing a dynamic image.

76 Claims, 28 Drawing Sheets

| FIG. 13A |
| FIG. 13B |

FIG. 20
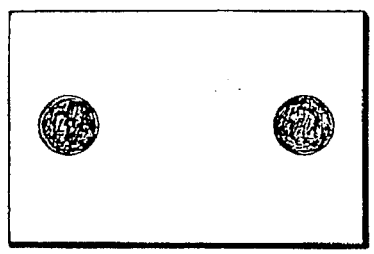 t=0.0sec
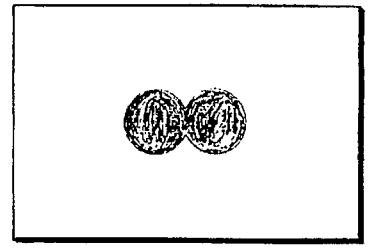 t=1.2sec
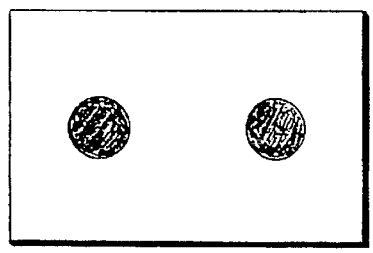 t=0.4sec
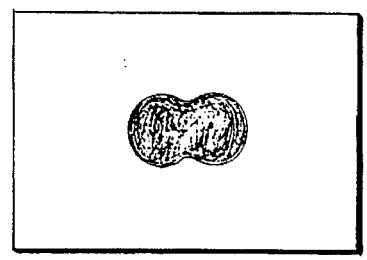 t=1.5sec
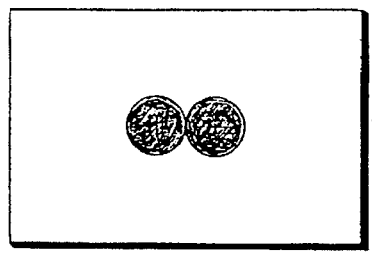 t=0.8sec
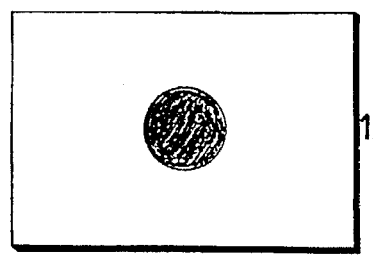 $1.8sec \leq t \leq 1.9sec$
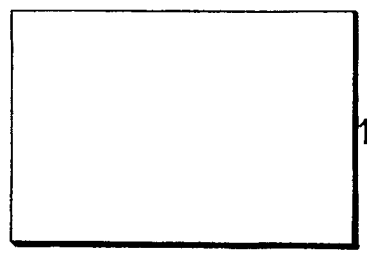 $1.9sec < t \leq 2.0sec$

| FIG. 23A | FIG. 23B |

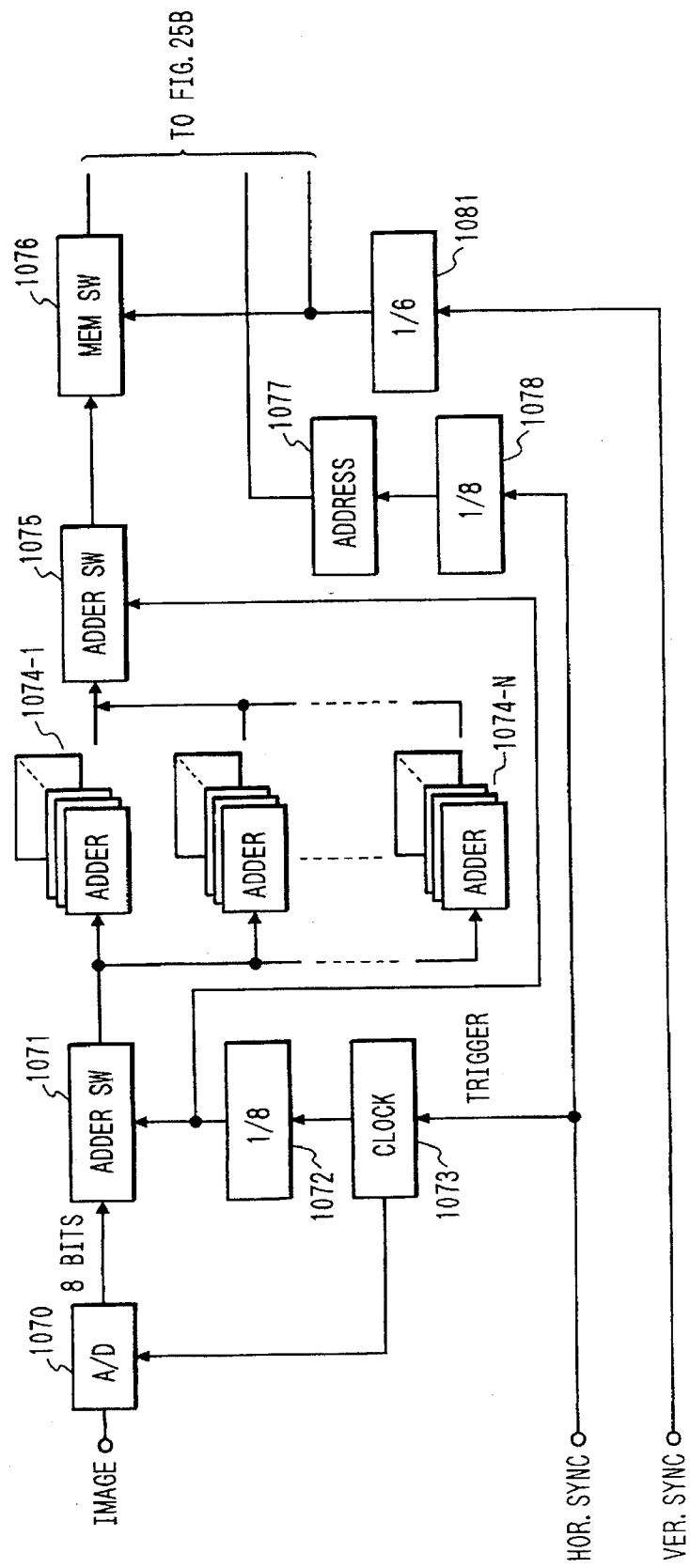

IMAGE PROCESSING METHOD

This application is a continuation of application Ser. No. 08/169,528 filed Dec. 20, 1993 now abandoned.

BACKGROUND OF THE INVENTION

1. Field of the Invention

The present invention relates to an image processing method for recording, transmitting, and reproducing monochrome and color density or gray images and dynamic images and, more particularly to an image processing method for performing compression and development of gray image data, and performing coding and decoding of dynamic image information.

2. Related Background Art

In general, when a gray image is recorded on a recording medium, for example, an image read by a scanner is converted into, e.g., density data, and digital data is recorded on a recording medium. However, since recording of all pixel information requires a huge storage capacity, the gray image is divided into recording units coarser than pixels of the scanner, and average values of these recording unit intervals are recorded. Upon reproduction of an image, smoothing and edge sharpening are performed as needed.

Techniques for coding a gray image are roughly classified into a preservation type compression method which preserves a whole information amount, and a non-preservation type compression method which allows an information loss to some extent. As the former method, a DPCM (differential PCM) method, a predictive coding method, a block adaptive type variable length coding method, a bit plane coding method, a hierarchical coding method, and the like are known. As the latter method, a predictive coding method, a transform coding method, a vector quantization method, a block truncation coding method, and the like are known.

Transmission and reproduction of dynamic images have been conventionally performed in the field of television. As a conventional image coding (compression) method, a band compression technique is known. In recent years, along with advances of the digital signal processing techniques and digital communication techniques, data compression based on digital processing is performed.

As is well known, a dynamic image consists of a plurality of frames (e.g., 30 frames per sec). Dynamic image coding techniques are classified into intra-frame coding for independently coding frames, and inter-frame coding for performing processing over a plurality of frames. In the case of a television, since one frame is normally constituted by two fields, the intra-frame coding is further classified into intra-field coding and inter-field coding.

In the intra-frame coding and intra-field coding, a coding technique of a still image can be applied to a dynamic image without modifications. In this case, in order to perform compression more effectively, the inter-frame coding is required. As the inter-frame coding techniques, the following conventional techniques are known:

(i) conditional pixel supplement method (ii) motion-compensated prediction and background prediction (iii) inter-frame adaptive prediction as a combination of inter-frame motion-corrected prediction and intra-field prediction The conditional pixel supplement method of item (i) is a technique for extracting and transmitting only data of moving portions of an image. In this technique, an inter-frame difference for each pixel is computed, and a pixel having a difference larger than a predetermined threshold value is output with an address for specifying the pixel.

In the motion-compensated prediction of item (ii), the position of an object of interest in the current frame is predicted by detecting the position and speed of an object of interest in a previous frame. Since the motion-compensated prediction is not effective for a background image which appears after an object moves, a second frame memory is arranged in an encoder to record only a background image separated from the moving object, and the recorded image is utilizes as a background image.

The inter-frame adaptive prediction of item (iii) is a combination of inter-frame motion-compensated prediction and intra-field prediction, and can applied to quick motions.

However, the conventional gray image processing method cannot satisfactorily reproduce a discontinuous change in density in each recording unit since a gray image is divided into recording units coarser than scanner pixels, and average values of the divided recording units are recorded.

The above-mentioned coding techniques require complicated computations, and their transform efficiencies largely depend on the image quality of an original image.

However, the above-mentioned inter-frame coding technique suffers from the following problems.

In the conditional pixel supplement method of item (i), the data amount to be coded undesirably increases with an increase in amount of image motion.

In the motion-compensated prediction of item (ii), the motion detection precision and detectable motion amount are limited. Furthermore, the background prediction requires two frame memories.

The inter-frame adaptive prediction of item (iii) requires a complicated arrangement as compared to the methods of items (i) and (ii).

In recent years, needs for recording, transmission, and compression of dynamic images have been extended to a wide range of media such as video telephones, video conferences, computer graphics, and the like in addition to televisions.

SUMMARY OF THE INVENTION

The present invention has been made in consideration of the conventional problems, and has as its object to provide an image processing method which can compress a gray image at a high compression ratio, and can reproduce an original image as faithfully as possible by a simple method.

It is another object of the present invention to provide an image processing method which can record, transmit, and reproduce an original image as faithfully as possible regardless of whether the density changes smoothly or discontinuously.

It is still another object of the present invention to provide an image processing method wherein when an image is recorded or transmitted, the gray level distribution of the image on a two-dimensional space is expressed by a curved surface in a three-dimensional space having an X-Y orthogonal coordinate system and a gray level axis perpendicular to these X and Y axes, a solid which has an image region as a bottom surface, and as a height a gray level range from a level equal to or lower than a minimum gray level to a level equal to or higher than a maximum gray level is formed, the solid is divided into a plurality of rectangular solids, and proportional values proportional to the volumes of regions at a lower-density side than the curved surface in the stacked rectangular solids are recorded or transmitted; and when an image is reproduced, for each of the rectangular solids which the curved surface crosses, curved surface portions which cross rectangular solids are reproduced on the basis of the proportional values of the rectangular solids and those of rectangular solids adjacent thereto, and the reproduced curved surface portions are coupled to reproduce the entire curved surface. It is still another object of the present invention to provide an image processing method for finely dividing a portion of the rectangular solid.

It is still another object of the present invention to provide an image processing method wherein when an image is recorded or transmitted, the gray level distribution of the image on a two-dimensional space is expressed by a curved surface in a three-dimensional space having an X-Y orthogonal coordinate system and a gray level axis perpendicular to these X and Y axes, predetermined lattice points are arranged in a gray level range from a level equal to or lower than a minimum gray level to a level equal to or higher than a maximum gray level to have an image region as a bottom surface so as to form three-dimensional regions having these lattice points as centers of gravity, and proportional amounts proportional to the volumes of regions, on a lower density side than the curved surface, of these three-dimensional regions are recorded or transmitted as proportional values of the lattice points; and when an image is reproduced, the entire curved surface is reproduced by computing passing points on the curved surface on the basis of the proportional values of the lattice points and those of lattice points adjacent thereto. It is still another object of the present invention to provide an image processing method wherein the arrangement density of some lattice points is higher than that of other lattice points.

It is still another object of the present invention to provide an image processing method wherein when the image is recorded or reproduced, the proportional values are compressed, and the compressed proportional values are recorded or transmitted; and when the image is reproduced, the compressed proportional values are developed, and thereafter, the image is reproduced. It is still another object of the present invention to provide an image processing method wherein the proportional values undergo diffusion processing upon reproduction of an image.

It is still another object of the present invention to provide an image processing method wherein the gray level of an image is preferably one of or a combination of the brightness of an image, the density of an image, and the number of printed dots per pixel, or is preferably the brightness and color difference information of a color image.

It is still another object of the present invention to provide a dynamic image processing method, which can be commonly applied to a variety of media, has a simple arrangement, and can realize both a high compression ratio and a high faithfulness in consideration of the above situation.

It is still another object of the present invention to provide a processing method which can record, transmit, and reproduce even quick motions.

It is still another object of the present invention to provide a processing method which can efficiently record, transmit, and reproduce any of a binary image, a gray image, a monochrome image, and a color image.

It is still another object of the present invention to provide the following image processing methods (A) and (B) for binary and multi-value images.

(A) When a dynamic image is recorded or transmitted, a set of points corresponding to image data of 1 in a dynamic image represented by binary data is expressed by one or a plurality of solids in a three-dimensional space which has an X-Y orthogonal coordinate system as an image plane, and a time base perpendicular to the X and Y coordinate axes, a region having the image region as a bottom surface, and a range from an image start time to an image end time as a height is divided into a plurality of rectangular solids, and Rv values proportional to volumes, inside the solid, of the divided rectangular solids are recorded and reproduced; and when the image is reproduced, a surface of the solid crossing the rectangular solids is reproduced on the basis of the Rv values of the plurality of rectangular solids and those of rectangular solids adjacent thereto, and the entire curved surface is reproduced by coupling the reproduced surfaces.

(B) When a dynamic image is recorded or reproduced, a dynamic image represented by multi-value data is expressed by one or a plurality of solids in a four-dimensional Euclidean space which has an X-Y orthogonal coordinate system as an image plane, a time base, and an axis representing a gray level, the four-dimensional space is divided into a plurality of rectangular solids, and Rv values proportional to volumes, inside the solid, of the divided rectangular solids are recorded and reproduced; and when the dynamic image is reproduced, a surface of the solid crossing the rectangular solids is reproduced on the basis of the Rv values of the plurality of rectangular solids and those of rectangular solids adjacent thereto, and the entire curved surface is reproduced by coupling the reproduced surfaces.

BRIEF DESCRIPTION OF THE DRAWINGS

FIG. 20 is a view showing a typical binary dynamic image;

DESCRIPTION OF THE PREFERRED EMBODIMENTS

<First Embodiment>

Figure 1B:
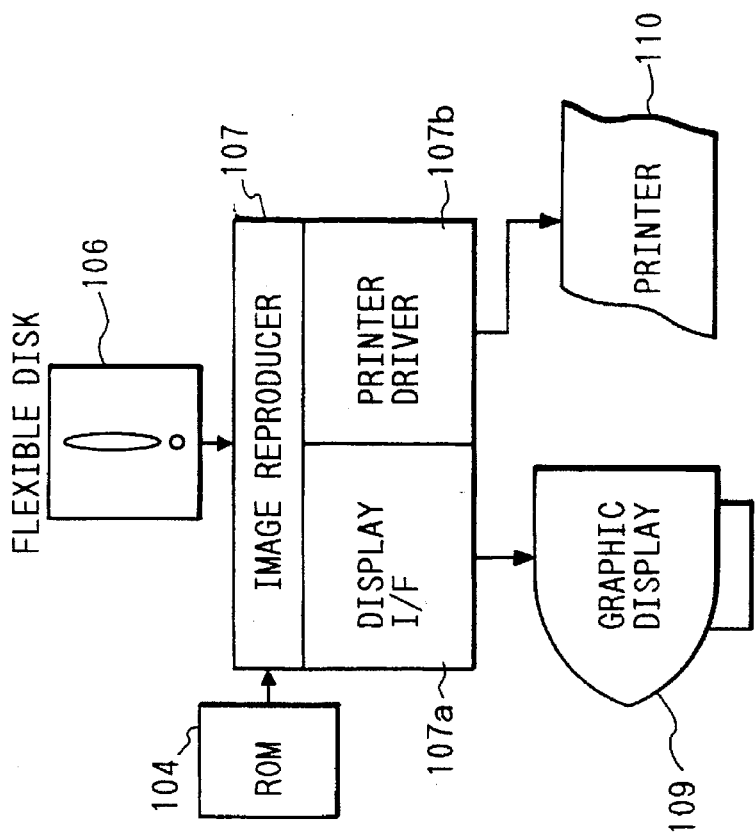
FIGS. 1A and 1B are block diagrams showing an embodiment of an image recording/reproduction apparatus which is applied to a gray image processing method according to the present invention.
Figure 1A:
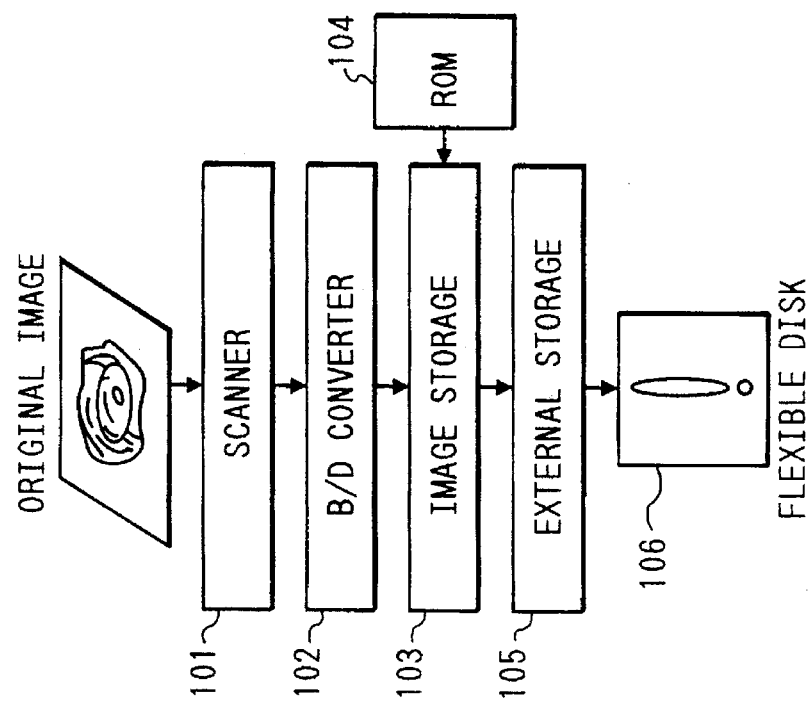

The preferred embodiments of the present invention will be described hereinafter with reference to the accompanying drawings. FIGS. 1A and 1B are block diagrams respectively showing an image recorder and an image reproducer to which an image processing method according to the present invention is applied.

In an image recording mode, as shown in FIG. 1A, the brightness data of an image read by a scanner 101 are converted into density data by a brightness to density converter 102 (hereafter "B/D converter 102"). Thereafter, an image storage unit 103 generates volume ratio (Rv) data (to be described later). This processing is performed by a microprocessor in the image storage unit 103 in accordance with a computation program stored in a ROM 104. The volume ratio (Rv) data are stored in a flexible disk 106 by an external storage unit 105.

On the other hand, in an image reproduction mode, as shown in FIG. 1B, the volume ratio (Rv) data are read out from the flexible disk 106, and are supplied to an image reproducer 107. The image reproducer 107 reads a volume ratio development program and a curved surface reproduction program from the ROM 104, and obtains density data at respective pixels. These data are converted into brightness data, and the converted data are displayed on a graphic display 109 via a display interface 107a. The brightness data are converted into dot density data by image processing of a printer driver 107b as needed, and the converted data are printed by an ink-jet printer 110.

As another apparatus, compressed volume ratio (Rv) data may be transmitted, and the image reproducer may receive and reproduce the volume ratio (Rv) data. In this case, the volume ratio (Rv) data may be transmitted as analog data. The image storage and the image reproducer may be constituted by a single or different computers. In this case, an image storage program and an image reproduction program (to be described later) may be stored in, e.g., a magnetic storage unit.

An embodiment (first embodiment) of a density image processing method according to the present invention will be described below with reference to FIGS. 2 to 8.

Figure 2:
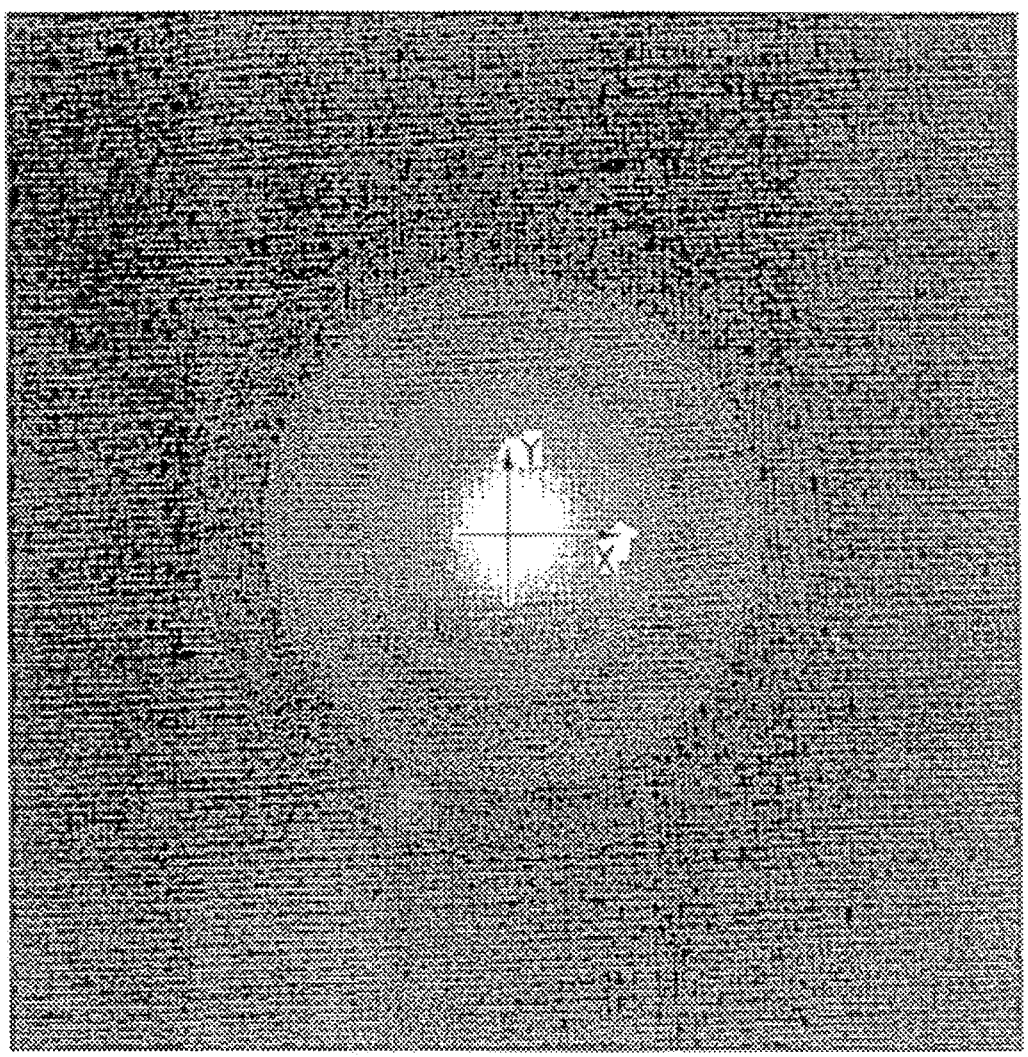
FIG. 2 is an explanatory view showing an example of an original image.
Figure 3:
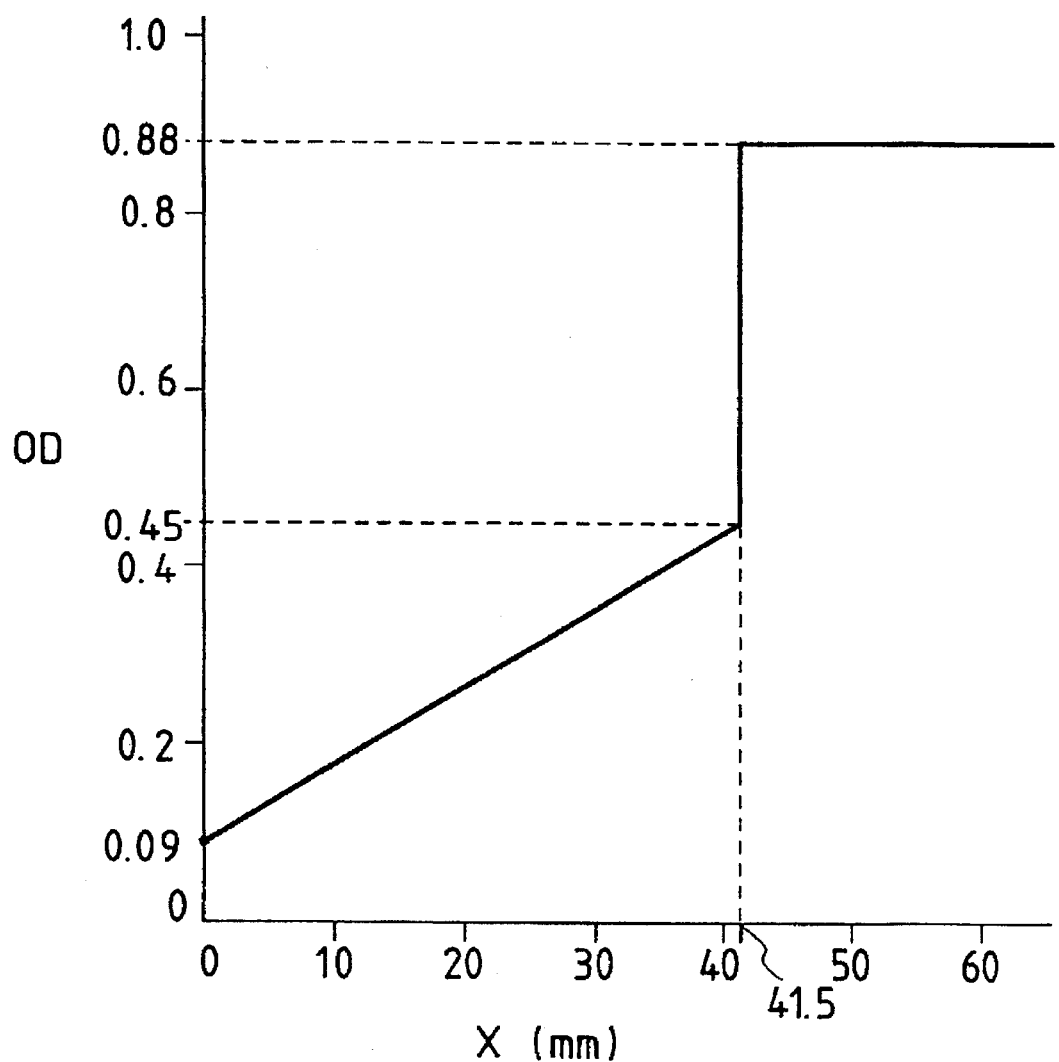
FIG. 3 is a graph showing the density distribution, in the X-axis direction, of the original image shown in FIG. 2.

FIG. 2 shows, as an example of an original image, an original image in a 133 mm×133 mm rectangular region, which an image is obtained by creating density data of 512×512 64-gray level concentric pixels by a computer in advance, and printing out the density data. FIG. 3 shows the density distribution of this original image in the X-axis direction, Referring to FIG. 3, the density of the center is lowest, i.e., has an OD value of 0.09. The density gradually increases in a point-symmetrical pattern. The OD value increases from 0.45 to 0.88 at a position separated by 41.5 mm from the center, and the OD value of a region outside 41.5 mm is uniformly 0.88.

Figure 4:
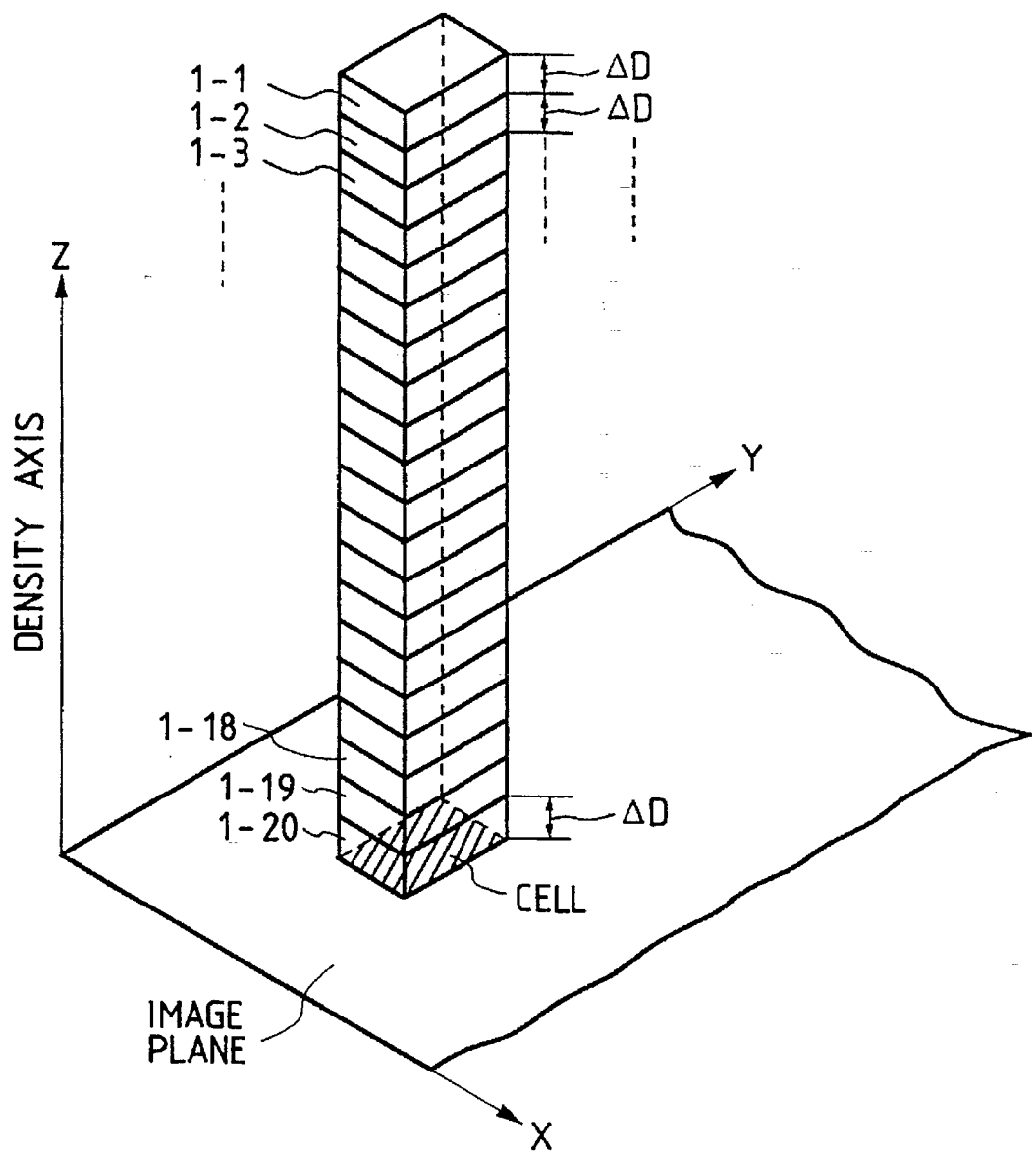
FIG. 4 is an explanatory view showing the density level width in units of cells.

When the original image having such density levels is recorded, the original image is read by the scanner 101, and thereafter, brightness data of the image are converted into density data by the B/D converter 102. Then, the image storage unit 103 equally divides the X-Y plane into 32×32 cells, and also equally divides the OD values from 0.0 to 1.0 into 20 density level widths at 0.05 intervals. More specifically, as shown in FIG. 4, a solid obtained by stacking 20 rectangular solids 1-1, . . . , 1-20 each having a height corresponding to the density level width $\Delta D$ (=0.05) on the Z axis (density level axis) of each cell is considered.

Figure 5:
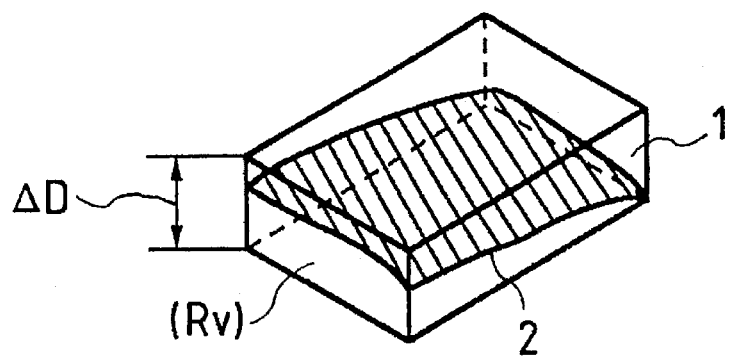
FIG. 5 is an explanatory view showing an example of a density distribution curved surface in each rectangular solid in FIG. 4.
Figure 6:
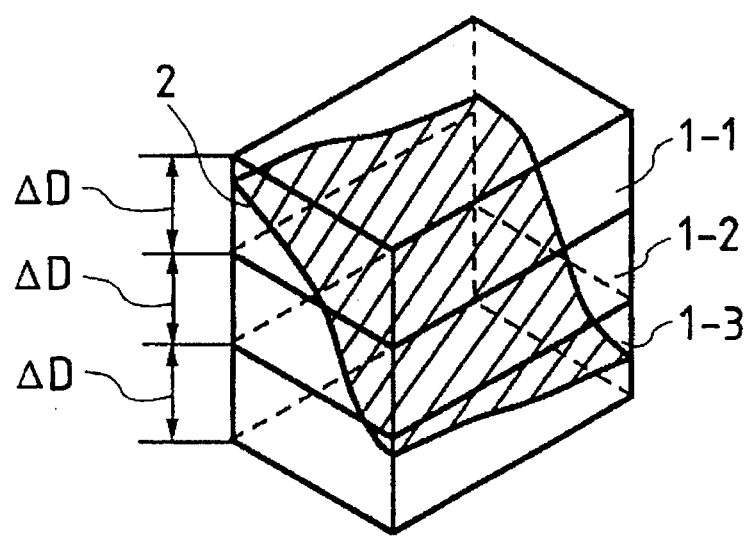
FIG. 6 is an explanatory view showing another density distribution curved surface.

FIGS. 5 and 6 show the density distribution curved surface of a rectangular solid 1. As shown in FIG. 5, when the density distribution in one cell is distributed in a single density level width, a volume ratio Rv below a curved surface 2 representing the density distribution in the rectangular solid 1 corresponding to the density level width $\Delta D$ is computed. On the other hand, as shown in FIG. 6, when the density distribution in one cell is distributed over a plurality of density level widths, for example, when the density level widths are distributed from three rectangular solids 1-1 to 1-3, the volume ratio Rv is computed for these rectangular solids 1-1 to 1-3.

In this embodiment, the computed volume ratio Rv is normalized to an 8-bit integer (=0 to 255). Therefore, of rectangular solids which do not cross the curved surface 2 representing the density distribution, a rectangular solid below the curved surface 2 has Rv=255, and a rectangular solid above the curved surface 2 has Rv=0. After this computation, the volume ratios Rv of all 32×32×20 rectangular solids are computed, and the volume ratios Rv are compressed. The compressed volume ratios Rv are stored as digital information in the flexible disk 106 via the external storage 105.

Figure 7:
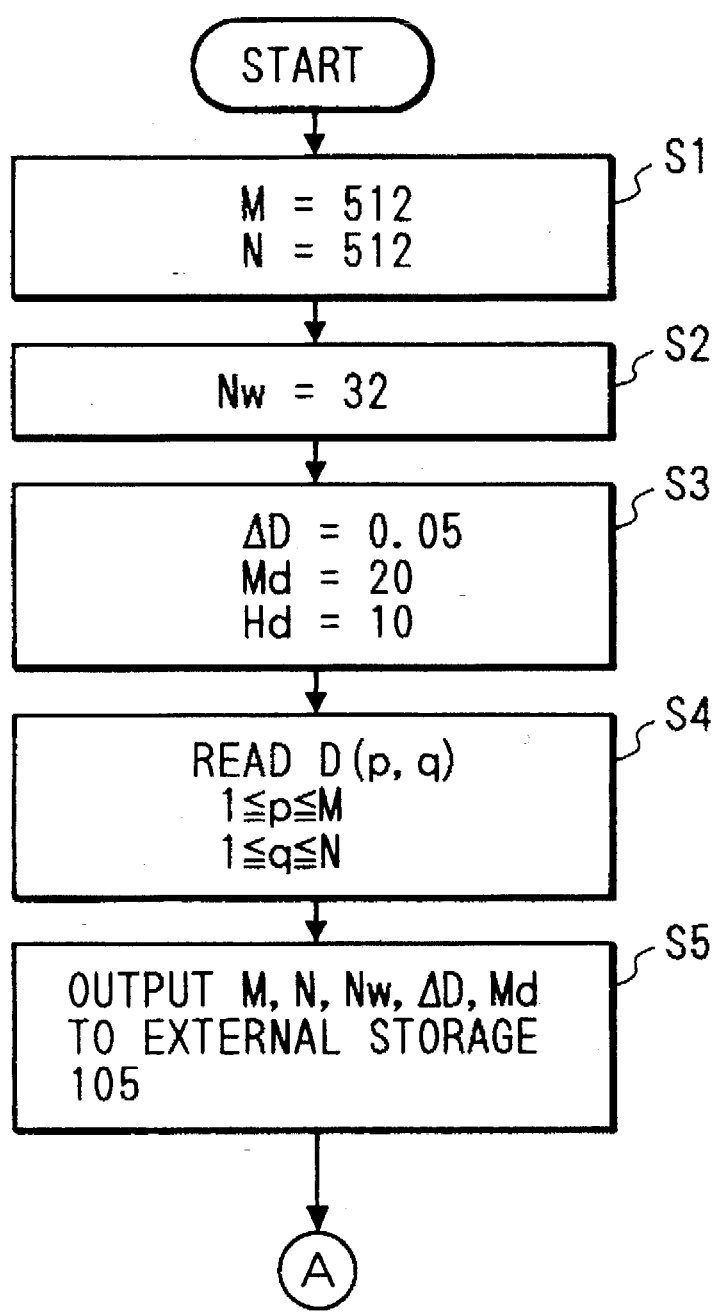
FIG. 7 is a flow chart (1/2) of an image storage program.
Figure 8:
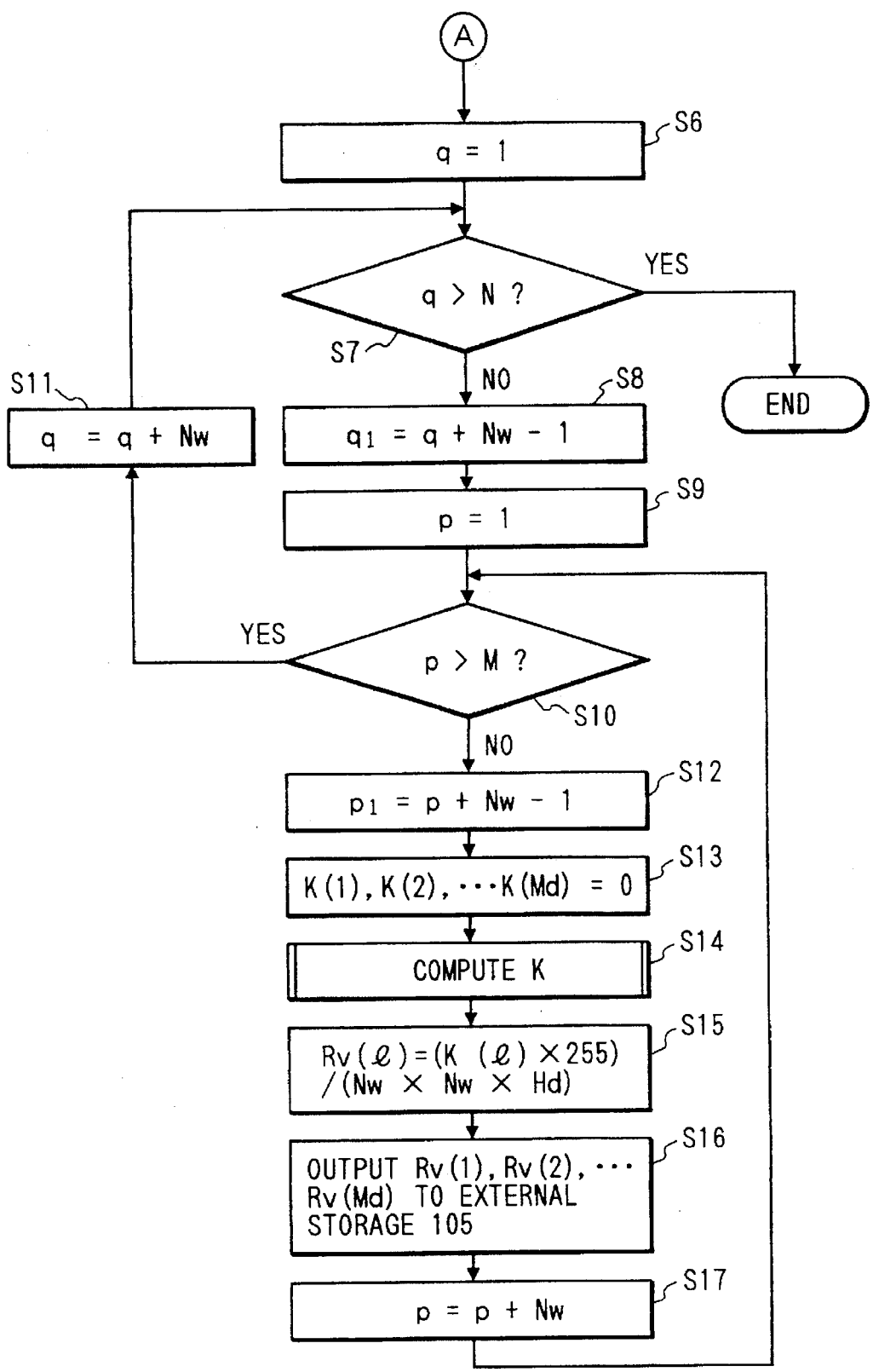
FIG. 8 is a flow chart (2/2) of the image storage program.

FIGS. 7 and 8 are flow charts of an image storage program showing a storage sequence of the density image in the image storage 103.

In step S1, the numbers M and N of pixels are respectively set to be 512, and in step S2, a cell size Nw is set to be 32.

In step S3, density dividing data is set. More specifically, the density level width $\Delta D$ is set to be 0.05, the number Md of rectangular solids is set to be 20, and a height Hd of each rectangular solid is set to be 10.

Density data D(p,q), are read from the ROM 104 (step S4), and the numbers M and N of pixels, the cell size Nw, the density level width ΔD, and the number Md of rectangular solids are output to the external storage unit 105 (step S5).

In step S6, density data q in the Y-axis direction is set to be "1", and the flow advances to step S7. Since q=1 is initially set, NO is determined in step S7, and the flow advances to step S8 to compute a $q_1$ value defined by the following equation (1):

$$q_1 = q + Nw - 1 \tag{1}$$

In step S9, density data p in the X-axis direction is set to be "1", and the flow advances to step S10. Since p=1 is initially set, NO is determined in step S10, and the flow advances to step S12 to compute a $p_1$ value defined by the following equation (2):

$$p_1 = p + Nw - 1 \tag{2}$$

Then, a K value (K(1), K(2), . . . , K(Md)) for each rectangular solid is reset to "0", and thereafter, a K value for each pixel is computed (step S14).

Figure 9:
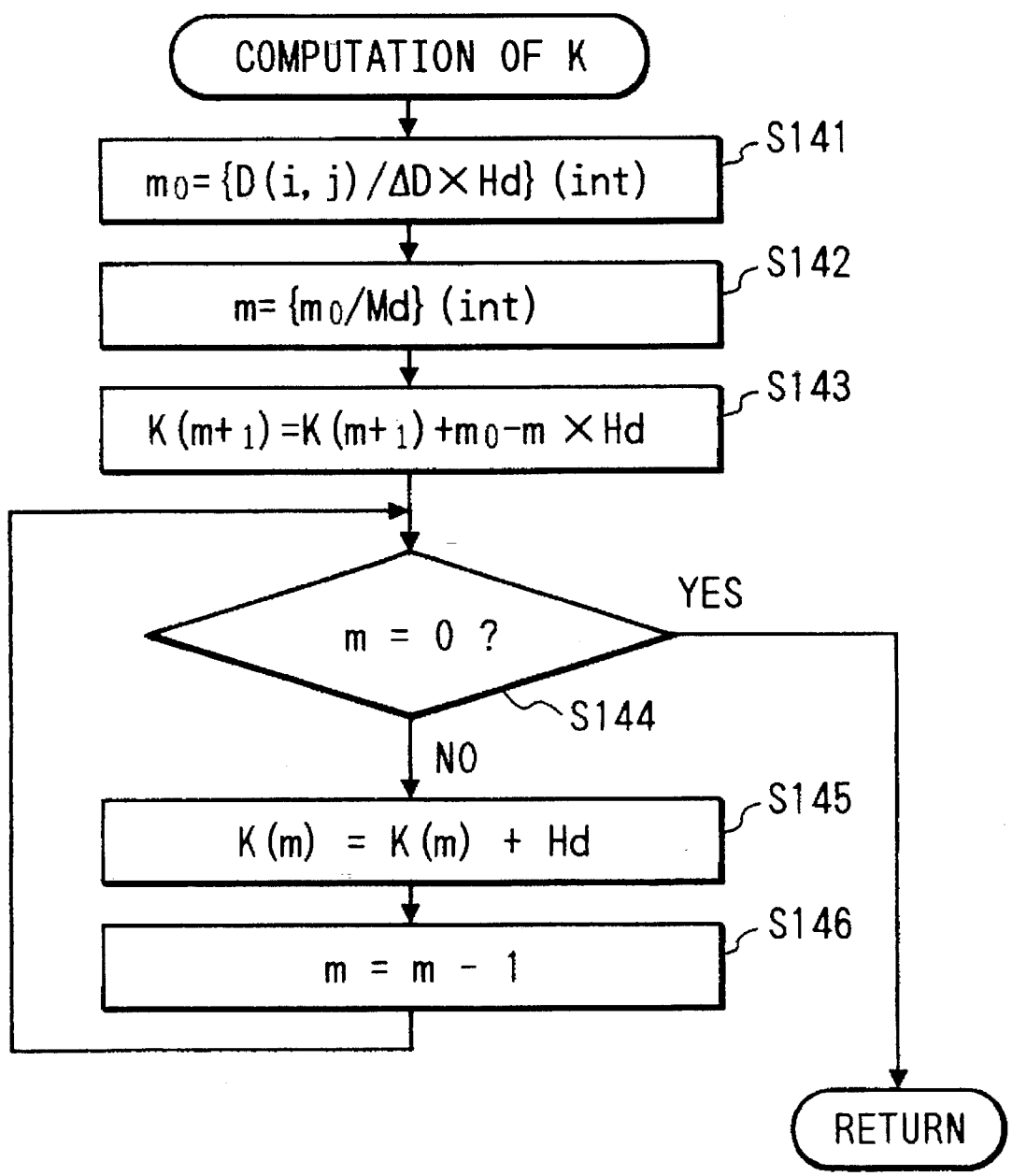
FIG. 9 is a flow chart of a K value computation routine.

More specifically, as shown in FIG. 9, in steps S141 to S143, a volume density K(m+1) below the density distribution curved surface to which a rectangular solid of interest belongs is computed, and in steps S144 to S146, all volume densities belonging to a portion below the density distribution curved surface are added to compute volume densities K(l) (l=1, 2, . . . , Md).

The flow then advances to step S15, and the volume densities K(l) are normalized to 8-bit integers on the basis of equation (3) below, thus computing volume ratios Rv(l):

$$Rv(l) = \frac{K(l) \times 255}{Nw \times Nw \times Hd} \tag{3}$$

These ratios Rv(l) (l=1, 2, . . . , Md) are output to the external storage 105 (step S16), and Nw is added to p (=1) to compute a new p value. Then, the flow in steps S10 to S17 is executed based on the new p value.

If YES is determined in step S10 in the loop later, i.e., if the p value exceeds M (=512), the flow advances to step S11 to compute a new q value by adding Nw to q (=1), and the flow in steps S7 to S17 is executed based on the new q value. If YES is determined in step S7 in the loop later, i.e., if the q value exceeds N (=512), this program ends. More specifically, this method is essentially different from a conventional method for dividing an image into a plurality of two-dimensional regions, and computing average densities of the divided regions.

On the other hand, when an image is reproduced, data are read out from the flexible disk 106, and the image reproducer 107 executes the volume ratio development program and the image reproduction program read from the ROM 104, thus obtaining density data of pixels. The density data are converted into brightness data, and the converted data are displayed on the graphic display 109 via the display interface 107a, or the density data are converted into dot density data by image processing, and the converted data are printed by the ink-jet printer 110 via the printer driver 107b.

Figure 10:
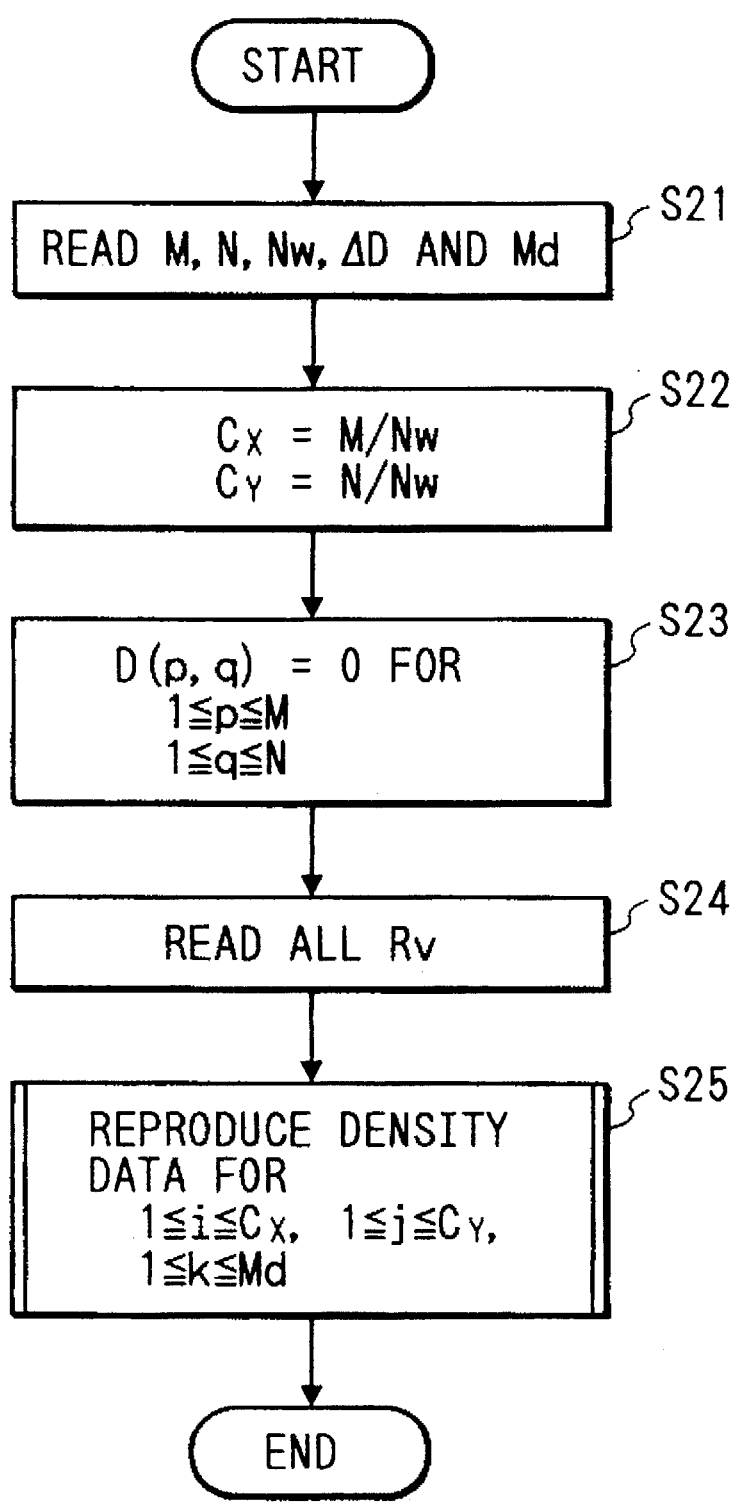
FIG. 10 is a flow chart of an image reproduction program.

FIG. 10 is a flow chart showing an example of the image reproduction program.

The control program of this flow chart is stored in the ROM 104, and is executed under the control of a CPU (central processing unit).

In step S21, the pixel number data M and N, the cell size Nw, the density level width ΔD, and the number Md of rectangular solids are read, and in step S22, the numbers CX and CY of cells are computed.

Then, all density data D(p,q) (1≦p≦M, 1≦q≦N) to be reproduced are set to be "0" (step S23), and the volume ratios Rv(i,j,k) of all rectangular solids are read out from the external storage unit (step S24). Thereafter, density data of 512×512 pixels which are the same as those in the original image are reproduced from the volume ratios Rv(i,j,k) (step S25). Note that i and j represent the position of a cell (1≦i≦32, 1≦j≦32), and k represents the density level (1≦k≦20).

Figure 11:
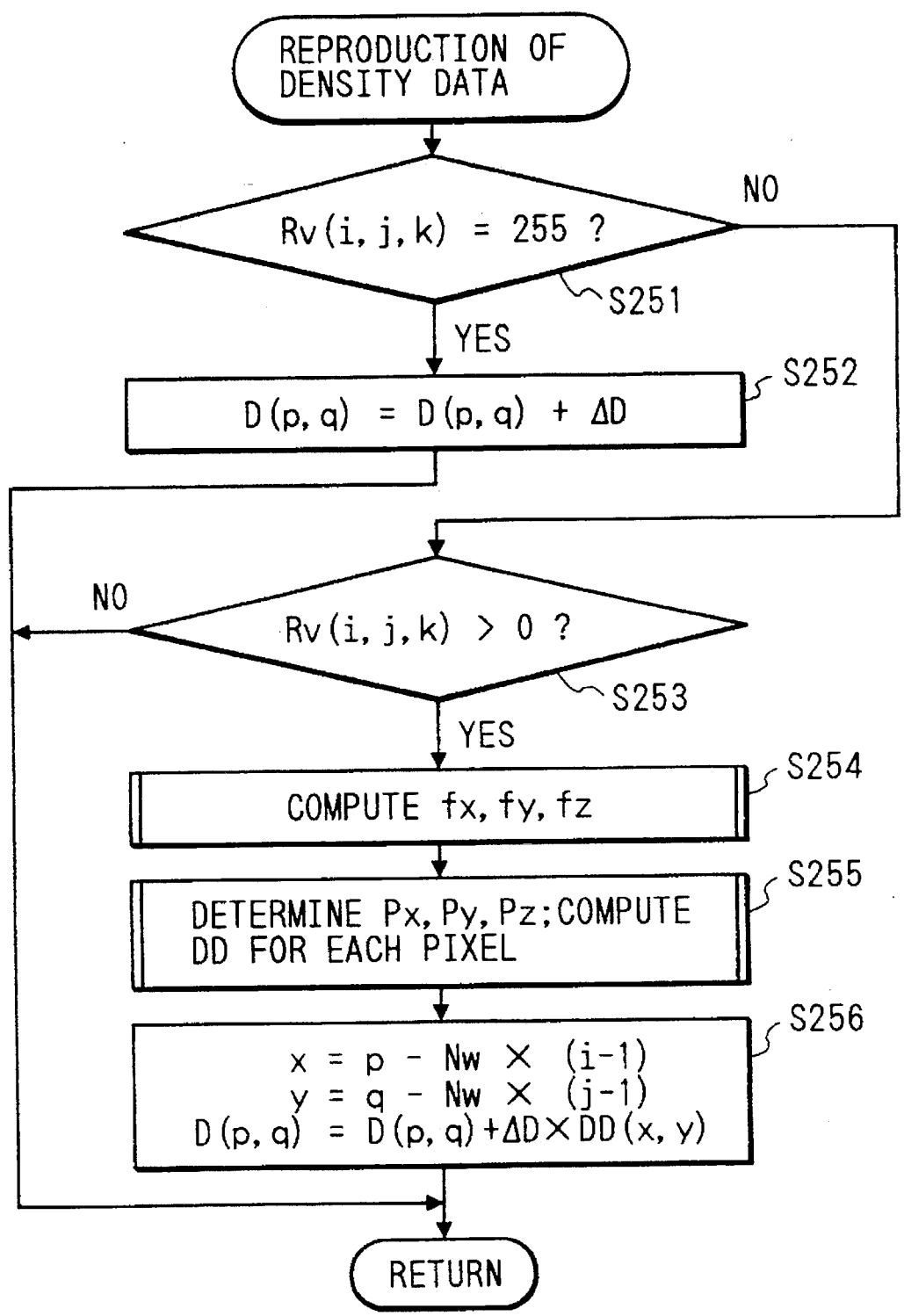
FIG. 11 is a flow chart showing a reproduction sequence of density data.

Upon reproduction of density data, as shown in detail in FIG. 11, it is checked if the volume ratio Rv(i,j,k) is "255" (step S251). If Rv(i,j,k)=255, the value of density data D(p,q) is increased by the density level width ΔD for all pixels within a range (to be referred to as a cell of interest hereinafter) obtained by projecting this rectangular solid onto the image plane, as shown in equation (4) below (step S252):

$$D(p,q) = D(p,q) + \Delta D \tag{4}$$

where p and q are all integers satisfying {32(i−1)+1}≦p≦32i and {32(j−1)+1}≦q≦32j.

On the other hand, if Rv(i,j,k)≠255, it is checked if Rv(i,j,k) is larger than 0 (step S253). If NO in step S253, it is determined that Rv(i,j,k)=0, and the flow returns to the program shown in FIG. 10.

On the other hand, if it is determined in step S253 that Rv(i,j,k) is larger than "0", i.e., if 0<Rv(i,j,k)<255, differential coefficients fx, fy, and fz of the volume ratio Rv at this point are computed (step S254). In this embodiment, some pieces of information of adjacent rectangular solids are used in consideration of discontinuity of the volume ratios Rv, and computations given by equations (5) to (8) below are performed.

$$fx = \frac{1}{32} \sum_{\Delta j=-1}^{1} \sum_{\Delta k=-1}^{1} c(\Delta j, \Delta k)\{Rv(i+1, j+\Delta j, k+\Delta k) - Rv(i-1, j+\Delta j, k+\Delta k)\} \tag{5}$$

$$fy = \frac{1}{32} \sum_{\Delta k=-1}^{1} \sum_{\Delta i=-1}^{1} c(\Delta k, \Delta i)\{Rv(i+\Delta i, j+1, k+\Delta k) - Rv(i+\Delta i, j-1, k+\Delta k)\} \tag{6}$$

$$fz = \frac{1}{32} \sum_{\Delta i=-1}^{1} \sum_{\Delta j=-1}^{1} c(\Delta i, \Delta j)\{Rv(i+\Delta i, j+\Delta j, k+1) - Rv(i+\Delta 1i, j+\Delta j, k-1)\} \tag{7}$$

where c is the differential operator, which can be described in the simplest matrix form:

$$c = \begin{bmatrix} 0 & 0 & 0 \\ 0 & 1 & 0 \\ 0 & 0 & 0 \end{bmatrix} \tag{8}$$

However, in order to cope with a spatially sudden change in density of an image, it is desirable that the operator c be given by:

$$c = \begin{bmatrix} 1 & 2 & 1 \\ 2 & 4 & 2 \\ 1 & 2 & 1 \end{bmatrix} \quad (8')$$

Also, Rv(i,j,0)=225; Rv(i,j,MD+1)=0; Rv(0,j,k)=0; Rv(CX+1,j,k)=0; Rv(i,0,k)=0; Rv(i,CY+1,k)=0.

In this embodiment, the normal to a plane obtained when a density distribution curved surface passing a rectangular solid is approximated by a plane is directed in the direction of a vector (fx,fy,fz), and hence, the position of the plane is moved in the direction of the vector, so that the volume ratio of the plane to the volume of the rectangular solid becomes closest to Rv(i,j,k)/255 and, more particularly, a difference of about 5% is obtained.

Then, positions Px, Py, and Pz of the density plane are determined, and a DD value for each pixel is computed (step S255).

Figure 12:
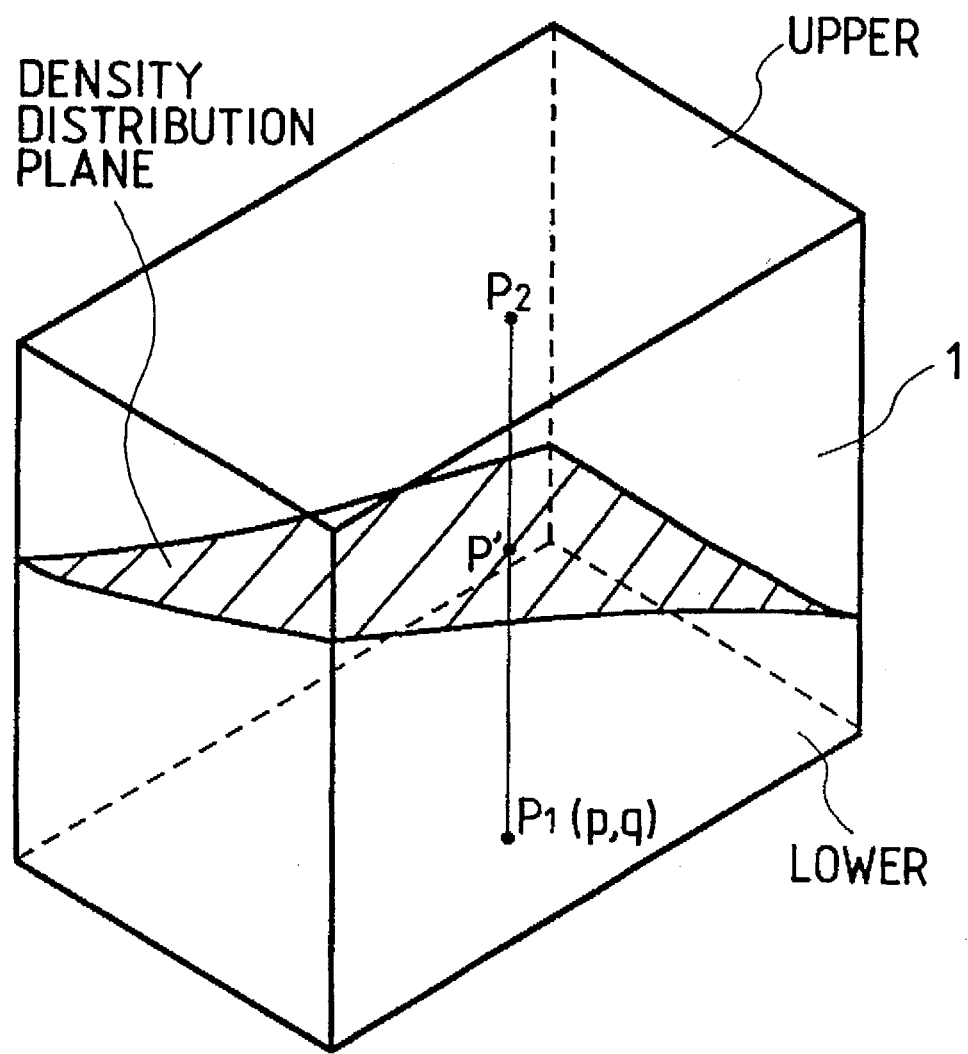
FIG. 12 is an explanatory view showing a reproduction method of the density distribution.

More specifically, referring to FIG. 12, the intersection (curved surface intersection) between the curved surface and a straight line which passes pixels (p,q) {32(i−1)+1}≦p≦32i, {32(j−1)+1}≦q≦32j in the cell, and extends parallel to the density axis is represented by P', the intersection between the straight line and the lower surface of the rectangular solid 1 is represented by $P_1$, and the intersection between the straight line and the upper surface of the rectangular solid is represented by $P_2$. When the intersection P' with the curved surface is located above the rectangular solid 1, P'=$P_2$; when the intersection P' with the curved surface is located below the rectangular solid 1, P'=$P_1$. Equation (9) below is computed using the obtained points $P_1$, $P_2$, and P':

$$D(p, q) = D(p, q) + \Delta D(\overline{P_1P'}/\overline{P_1P_2}) \quad (9)$$

$$\begin{pmatrix} 32(i-1)+1 \leq p \leq 32i \\ 32(j-1)+1 \leq q \leq 32j \end{pmatrix}$$

In this description, when the density distribution curved surface is parallel to the density axis, "the density is high" "below" the curved surface or the plane, and "the density is low" "above" the curved surface or the plane.

In step S256, density data D(p,q) are computed, and this program ends.

Figures 13, 13A:
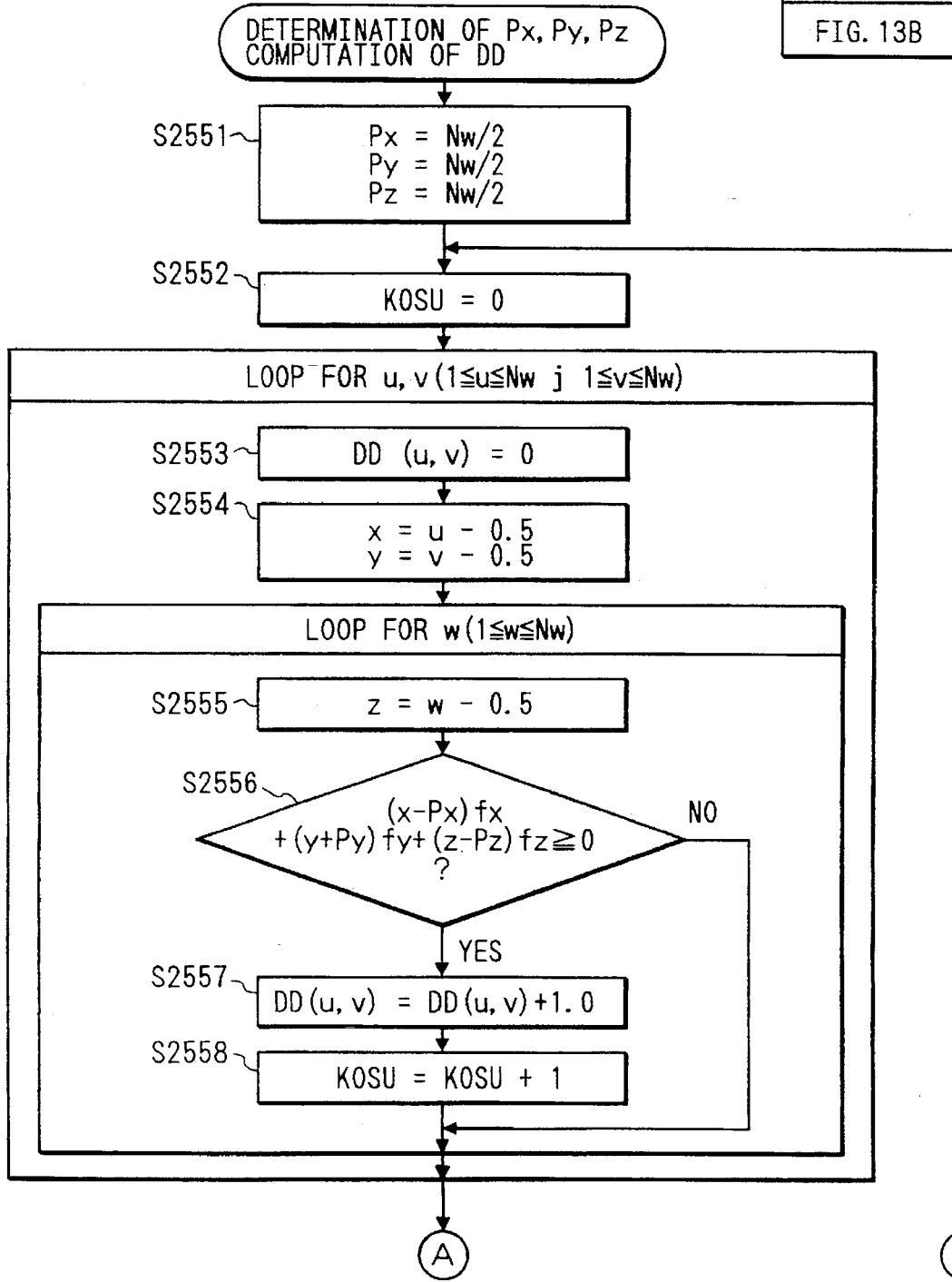
FIG. 13 is comprised of FIGS. 13A and 13B showing flow charts of a plane position determination & DD value computation method.
Figure 13B:
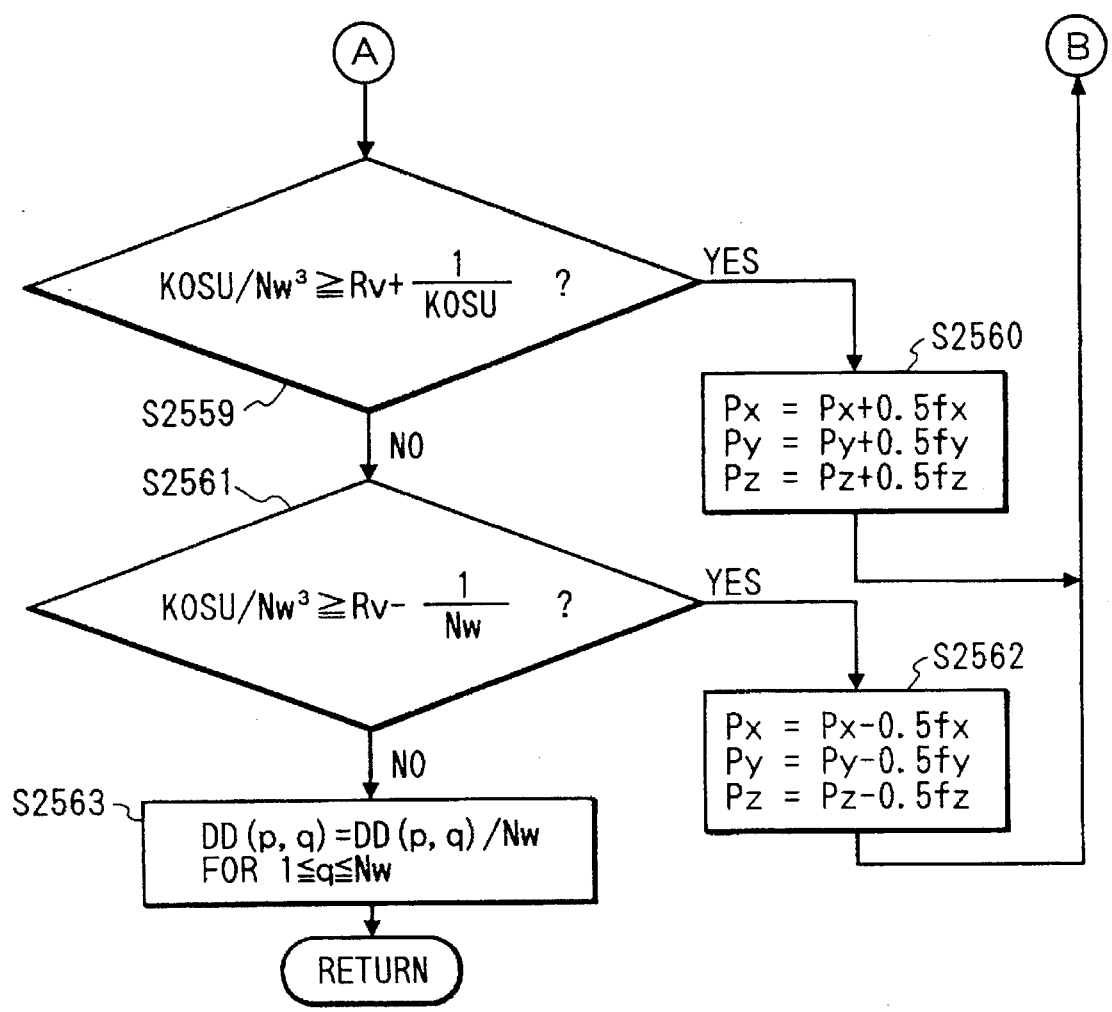

FIGS. 13A and 13B are flow charts showing the plane position determination and DD value computation method. In processing shown in FIGS. 13A and 13B, computations are performed while a rectangular solid of interest is equally divided into $Nw^3$ small rectangular solids.

In step S2551, the passing point (Px,Py,Pz) of the density curved surface is assumed to be the center of a rectangular solid, and in step S2552, the number KOSU of small rectangular solids satisfying inequality (10) below is set to be "0". Then, the control enters a loop for u and v. In step S2553, the DD value is set to be "0". In step S2554, the bottom surface of each small rectangular solid, i.e., the center of a pixel is computed, and the control enters a loop for W. In step S2555, the center of the height of each small rectangular solid is computed, and in step S2556, it is checked if inequality (10) is satisfied:

$$(x-Px)fx+(y-Py)fy+(z-Pz)fz \geq 0 \quad (10)$$

If NO in step S2556, W is incremented by 1, and the flow returns to step S2555; otherwise, 1.0 is added to the DD value in step S2557, and 1 is added to KOSU to increment W by 1 in step S2558. Then, the flow returns to step S2555.

When W reaches Nw, next (u, v) are selected, and the flow returns to step S2553. When u and v reach (Nw, Nw), i.e., if processing is completed for all the small rectangular solids, the flow advances to step S2559. It is checked in step S2559 if the following inequality (11) is satisfied:

$$\frac{KOSU}{NW^3} \geq Rv + \frac{1}{Nw} \quad (11)$$

If YES in step S2559, the flow advances to step S2560 to correct the plane position toward the positive side, and the flow returns to step S2552.

On the other hand, if NO in step S2559, the flow advances to step S2561 to check if the following inequality (12) is satisfied:

$$\frac{KOSU}{NW^3} \leq Rv - \frac{1}{Nw} \quad (12)$$

If YES in step S2561, the flow advances to step S2562 to correct the plane position toward the negative side, and the flow returns to step S2552.

On the other hand, if NO in step S2561, the flow advances to step S2560 to compute the DD value, and the flow returns to the flow chart shown in FIG. 11.

Figure 14:
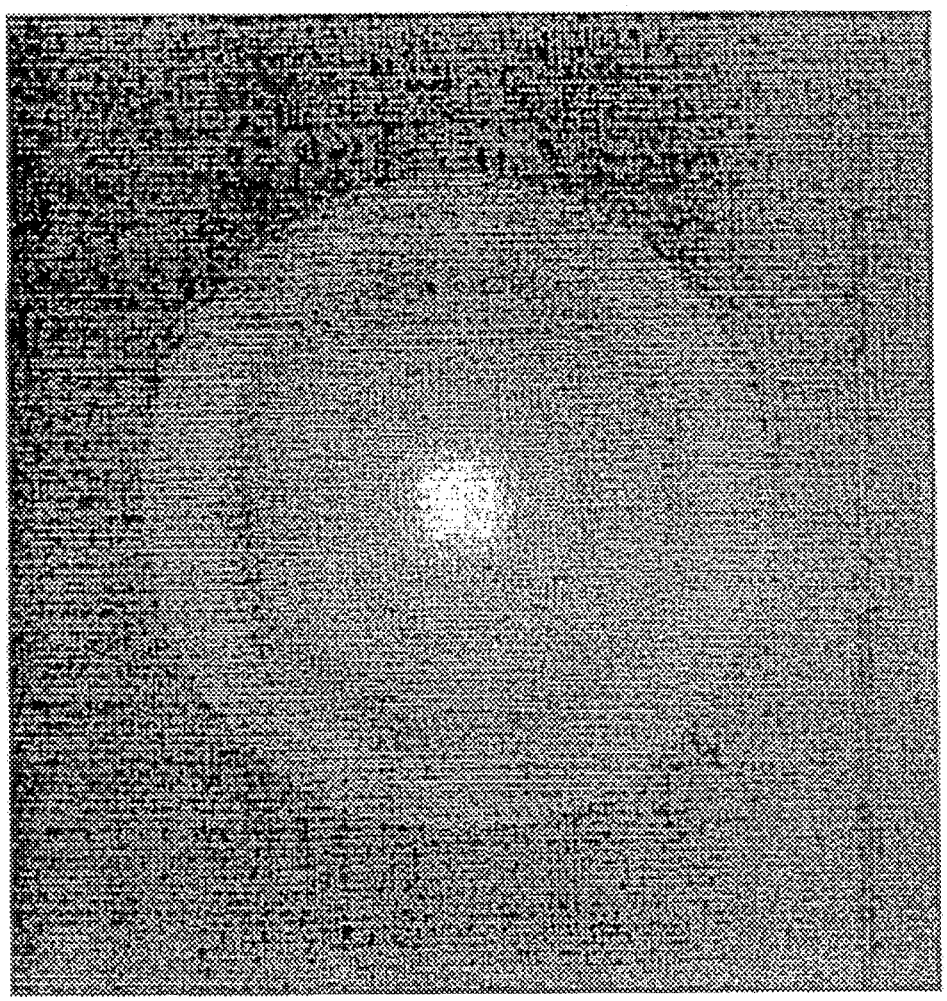
FIG. 14 is an explanatory view showing a reproduced image.

In this manner, an original image having density data of 512×512 pixels is reproduced, known image processing is executed based on this density curved surface distribution, and a reproduced image is printed out. FIG. 14 shows an example of a printout image. As can be seen from FIG. 14, an original image is relatively satisfactorily reproduced. In particular, a stepwise change in density in a range considerably narrower than the cell width is satisfactorily reproduced.

The image storage amount of this embodiment is 32×32×20×8 bits=20 Kbytes (1K=1,024), and is about ⅟₁₃ of an information amount (=256 Kbytes) obtained when, for example, each pixel of an original image consisting of 512×512 pixels is 8-bit density data. In order to further decrease the storage capacity, for example, by utilizing the fact that rectangular solids each of which satisfies 0<Rv(i,j,k)<255, or in each of which Rv=255 and at least one of six adjacent surfaces of the rectangular solid satisfies Rv=0 in each cell (i,j) are continuous along the density axis (Z axis) like $k_1 \leq k \leq k_1+\Delta k$, $k_1$, $\Delta k$, and {Rv(i,j,k), $k_1 \leq k \leq k_1+\Delta k$} may be stored.

In this case, since $k_1$ ranges from 1 to 20, and $\Delta k$ satisfies $0 \leq \Delta k \leq (20-k_1)$, 210 combinations of $k_1$ and $k\Delta$ are possible, and their information amount is 1 byte. Also, since the average value of ($\Delta k+1$) is about 2, the information amount per cell is about 3 bytes. Therefore, the total storage amount is about 3 Kbytes, and the above-mentioned storage amount of 20 Kbytes can be further compressed to about ⅟₇. Upon reproduction of an image, rectangular solids whose volume ratios Rv are not stored are defined by:

Rv(i,j,k)=255 (k<$k_1$)

or

R(i,j,k)=0 (k>$k_1+\Delta k$)

and thereafter, desired image reproduction can be performed.

As another storage method, rectangular solids satisfying Rv=0 may be expressed by 2 bits "00", rectangular solids satisfying Rv=1 may be expressed by 2 bits "01", rectangular solids satisfying 0<Rv<255 may be expressed by a bit train "100000000 (binary notation)+Rv" (9 bits), and these data may be further compressed by a known run-length method.

In the above-mentioned method, the density distribution curved surface is approximated by a plane in a rectangular solid, and the edge of an image is linearly approximated. In order to more faithfully reproduce a change in density of an original image, it is necessary to reproduce second-order differential information of the density, and to allow reproduction of the contour of an image by a curve. In this case, in addition to the differential coefficients fx, fy, and fz of the volume ratio Rv, $\partial^2 Rv/\partial x^2 \equiv fxx$, $\partial^2 Rv/\partial y^2 \equiv fyy$, $\partial^2 Rv/\partial z^2 \equiv fzz$, $\partial^2 Rv/\partial x \partial y \equiv fxy$, $\partial^2 Rv/\partial y \partial z \equiv fyz$, and $\partial^2 Rv/\partial z \partial x \equiv fzx$ as second-order differential coefficients are computed by a method similar to that for fx, fy, and fx described above. $f(x,y,z)=\text{const}$. $\{z=z(x,y)\}$ are differentiated by x and y to compute $\partial z/\partial x$, $\partial z/\partial y$, $\partial^2 z/\partial x^2$, $\partial^2 z/\partial x \partial y$, and $\partial^2 z/\partial y^2$ at the center of a rectangular solid from these first- and second-order differential coefficients.

More specifically, equations (13) to (17) are computed:

$$\partial z/\partial x = -fx/fz \tag{13}$$
$$\partial z/\partial y = -fy/fz \tag{14}$$
$$fxx + 2fzx(\partial z/\partial x) + fz(\partial^2 z/\partial x^2) + fzz\ (\partial z/\partial x)^2 = 0 \tag{15}$$
$$fxy + fzx(\partial z/\partial y) + fyz(\partial z/\partial x) + fz(\partial^2 z/\partial x \partial y) + fzz(\partial z/\partial x)(\partial z/\partial y) = 0 \tag{16}$$
$$fyy + 2fyz(\partial z/\partial y) + fz(\partial^2 z/\partial y^2) + fzz\ (\partial z/\partial y)^2 = 0 \tag{17}$$

When $|fz|<<|fx|$ and $|fz|<<|fy|$, the density curved surface crossing the rectangular solid is substantially parallel to the Z axis, i.e., the density changes stepwise in the cell, and a first- or second-order differential of x with respect to y and z or a first- or second-order differential of y with respect to z and x is computed in place of computing a first- or second-order differential of z with respect to x and y. More specifically, if $|fy|\leq|fx|$, the former is selected; if $|fx|\leq|fy|$, the latter is selected.

In this manner, the first- and second-order differential coefficients of the curved surface at the center of the rectangular solid are obtained, and the curved surface is extrapolated in the rectangular solid using these differential coefficients.

Upon actual computation of equations (13) to (17), differentials are replaced by differences.

When the obtained volume ratio below the curved surface is larger than the volume ratio Rv of the corresponding rectangular solid, e.g., when it is larger by 5% or more, the curved surface is slightly translated in the direction of (fx, fy, fz); when the obtained volume ratio is smaller than the volume ratio of the corresponding rectangular solid, e.g., when it is smaller by 5% or more, the curved surface is slightly translated in the direction of (-fx,-fy,-fz), thus approaching the computed volume ratio to the actual volume ratio Rv.

When the Rv value of a rectangular solid of interest is very small (e.g., $10^{-2}$ or less), it is often impossible to reproduce the curved surface with high precision by the above-mentioned method. In this case, when the Rv value is diffused using the following diffusion equation (18) before fx, fy, fz, and the like are computed, the curved surface can be reproduced with high precision:

$$Rvnew(i, j, k) = DI\ \{Rv(i+1, j, k) + Rv(i-1, j, k) + \tag{18}$$
$$Rv(i, j+1, k) + Rv(i, j-1, k) + Rv(i, j, k+1) +$$
$$Rv(i, j, k-1) - 6Rv(i, j, k)\}$$

$Rv(i, j, k) = Rvnew(i, j, k)$ where DI is the diffusion coefficient, which is selected to be ⅙ or less in consideration of stability. When this processing is repeated several times, the curved surface can be reproduced with high precision even for a rectangular solid having a small Rv value. Therefore, according to this embodiment, even when a difference in density distribution gradient of an original image is not particularly considered, the storage information amount naturally increases for a region having a steeper change in density. Consequently, original image data can be efficiently preserved, and can be faithfully reproduced.

<Second Embodiment>

Figure 15:
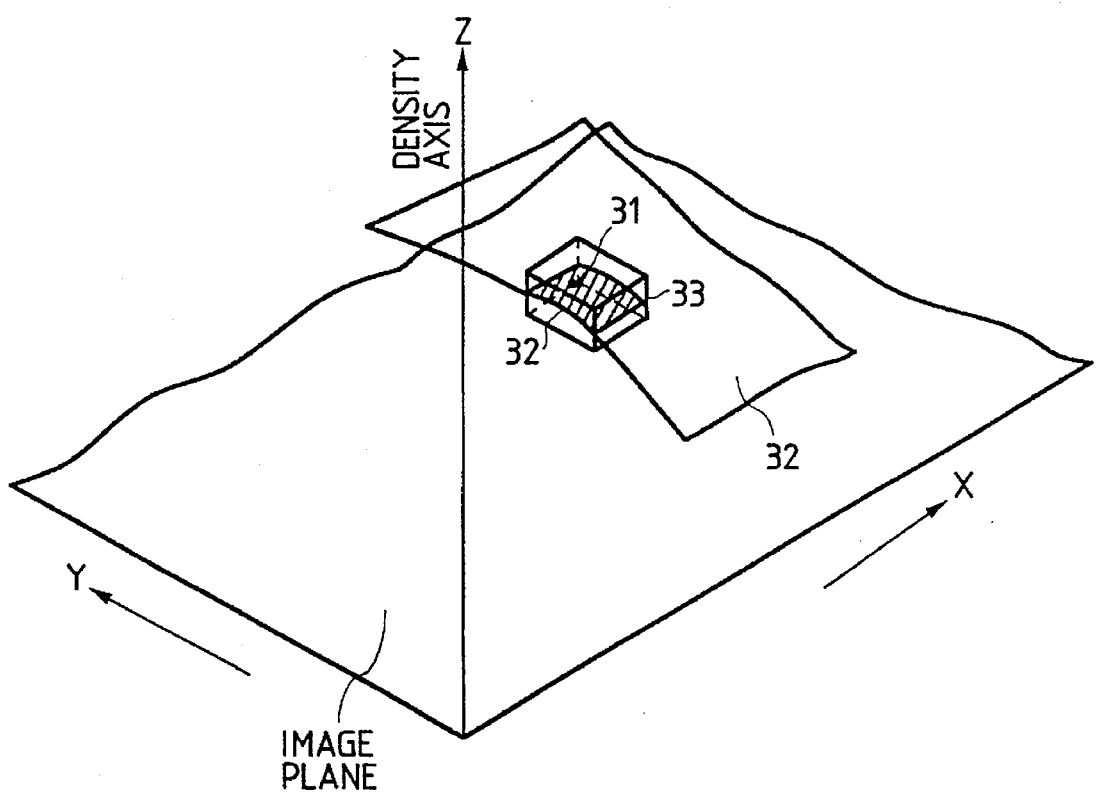
FIG. 15 is an explanatory view showing the second embodiment.
Figure 16A:
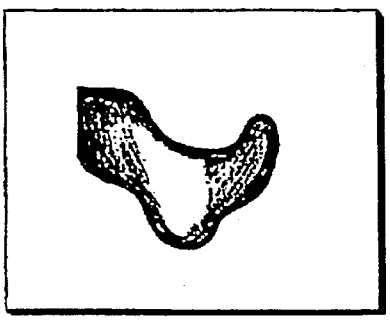
FIGS. 16A and 16B are explanatory views respectively showing an original image and a reproduced image in the second embodiment.
Figure 16B:
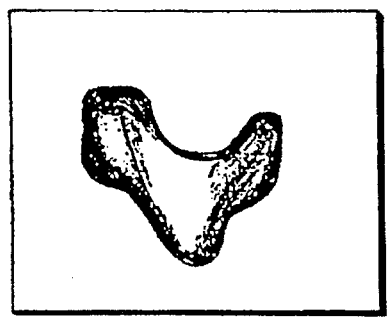

The second embodiment will be described below with reference to FIG. 15 and FIGS. 16A and 16B. In this embodiment, as shown in FIG. 15, lattice points 31 are provided at equal intervals of $\Delta x=2$ mm, $\Delta y=2$ mm, and $\Delta z=0.05$ in a three-dimensional space defined by the X and Y axes defining an image plane, and the Z axis defining a density level. Note that the unit of a numerical value plotted along the Z axis is the OD value. In a rectangular solid 33 which has a lattice point 31 as the center (the center of gravity), and has a length of $2\Delta x=4$ mm, a width of $2\Delta y=4$ mm, and a height of $2\Delta z=0.1$, a volume ratio Rv below a density distribution curved surface 32 is computed, and the calculated volume ratio Rv is similarly expressed by 8 bits (0 to 255).

In this embodiment, computation regions ($2\Delta x \times 2\Delta y \times 2\Delta z$) having adjacent lattice points 31 as the centers have a common region, and serve to smooth the distribution of the volume ratios Rv. When the computation region ($2\Delta x \times 2\Delta y \times 2\Delta z$) is narrowed, discontinuous volume ratios Rv are reflected as they are. Therefore, when the length, width, and height are respectively $\Delta x$, $\Delta y$, and $\Delta z$ described above, the same effect as in the first embodiment is provided.

When the computation region ($2\Delta x \times 2\Delta y \times 2\Delta z$) is set to be considerably large, a change in volume ratio Rv is overly smoothed, and consequently, a change in density or its shape is obscured. For this reason, it is preferable that the length of each side of each computation region be set to be about 1.5 to 2.5 times of the distance between two adjacent lattice points 31. When a lattice point 31 coincides with a point at the end of an image region, a region inside the above-mentioned region, i.e., a region inside the three-dimensional region having the image region as a bottom surface may be considered as the computation region.

When the obtained volume ratios Rv are digitally recorded while excluding lattice points corresponding to Rv=0 and Rv=255, the storage capacity can be reduced as in the first embodiment. Upon reproduction, the volume ratios Rv in a total of six directions, i.e., $\pm x$ directions, $\pm y$ directions, and $\pm z$ directions are referred to from lattice points satisfying $0<Rv<255$, and it is checked if the volume ratios Rv of a lattice point 31 of interest and another lattice point 31 adjacent thereto sandwich a predetermined value (e.g., "255/2") therebetween. If the volume ratios Rv sandwich the predetermined value therebetween, it is assumed that the density distribution curved surface 32 is present between these two lattice points 31, and its position is computed by interpolation. In this manner, for all the lattice points 31, the position of the density distribution curved surface 32 present between two adjacent lattice points 31 is computed, and the entire density distribution curved surface can be reproduced.

In the second embodiment, the reproduced density distribution curved surface 32 is defined by coupling planes or bilinear curved surfaces ($z=\alpha+\beta x+\gamma y+\delta xy$), and is always continuous unlike in the first embodiment. FIG. 16A shows an original image, and FIG. 16B shows an image obtained by reproducing the original image shown in FIG. 16A according to the second embodiment. As can be seen from FIGS. 16A and 16B, the original image is almost faithfully reproduced in this embodiment.

As another method of computing the volume ratio Rv of the lattice point 31, a function V of the volume ratio Rv can be interpolated by the following equation (19):

$$V(\xi,\eta,\zeta) = \sum_{\alpha=0}^{3}\sum_{\beta=0}^{3}\sum_{\gamma=0}^{3} Rv(\alpha,\beta,\gamma) \cdot E_\alpha(\xi) \cdot E_\beta(\eta) \cdot E_\gamma(\zeta) \quad (19)$$

Note that $E_m(x)$ ($m=0, 1, 2, 3$) is called an Overhauser's cubic polynomial, and is given by equations (20) to (23) below. At a boundary of regions, their values and linear differential coefficients become continuous.

$$E_0(x) = -0.5x + x^2 - 0.5x^3 \quad (20)$$

$$E_1(x) = 1 - 2.5\, x^2 + 1.5x^3 \quad (21)$$

$$E_2(x) = 0.5x + 2x^2 - 1.5x^3 \quad (22)$$

$$E_3(x) = -0.5x^2 + 0.5x^3 \quad (23)$$

Figure 17:
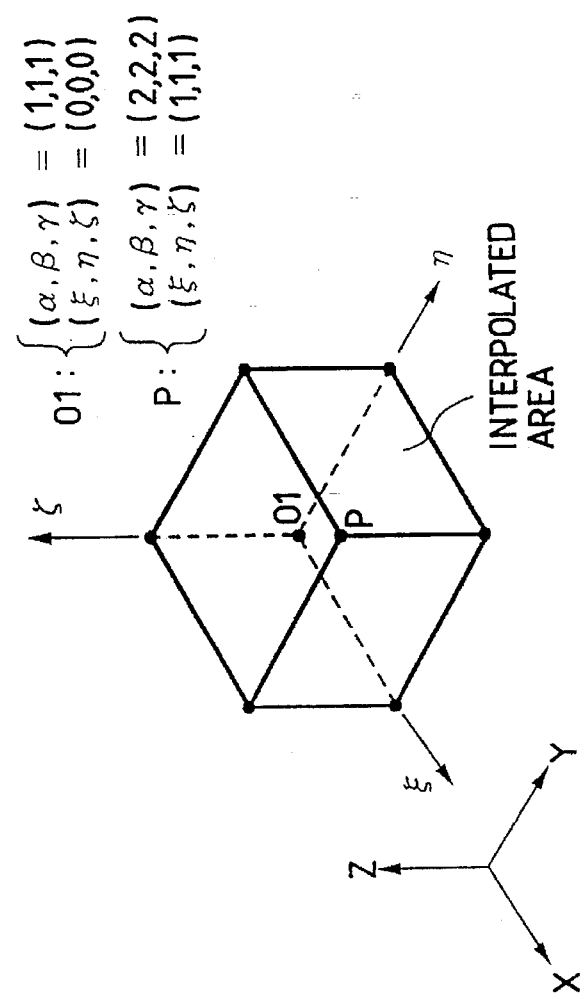
FIG. 17 is an explanatory view showing a modification of the second embodiment.

Note that $\xi$, $\eta$, and $\zeta$ in equation (19) are the local coordinate system, and are respectively parallel to the X, Y, and Z axes, as shown in FIG. 17. A point O1 in FIG. 17 is a lattice point of interest, and is defined by $(\xi,\eta,\zeta)=(0,0,0)$. Thus, a space satisfying $0 \leq \xi \leq 1$, $0 \leq \eta \leq 1$, and $0 \leq \zeta \leq 1$ is interpolated by equation (19) above.

Note that $(\alpha,\beta,\gamma)$ in equation (19) are the local lattice numbers, and satisfy a relation given by equation (24) below:

$$\begin{pmatrix}\alpha\\\beta\\\gamma\end{pmatrix} = \begin{pmatrix}\xi\\\eta\\\zeta\end{pmatrix} + \begin{pmatrix}1\\1\\1\end{pmatrix} \quad (24)$$

Therefore, interpolation can be performed using Rv values at a total of 64 points, i.e., $\xi=-1, 0, 1, 2$; $\eta=-1, 0, 1, 2$; and $\zeta=-1, 0, 1, 2$. Note that in FIG. 17, $(\alpha,\beta,\gamma)=(1,1,1)$ indicates the lattice point O1 of interest, and a point P is indicated by $(\xi,\eta,\zeta)=(1,1,1)$ and $(\alpha,\beta,\gamma)=(2,2,2)$. When the volume ratio distribution in the space is obtained in this manner, a set of points $(\xi,\eta,\zeta)$ which yield $V(\xi,\eta,\zeta)=a$ predetermined value (e.g., "128") corresponds to the density distribution curved surface. When the lattice point O1 of interest is moved to all lattice points excluding those corresponding to the edge of the image region, the density distribution curved surface can be obtained over the entire image region.

Note that the reproduction method using the Overhauser's polynomial can provide an effect of high faithfulness upon reproduction since the density distribution curved surface is continuous over the entire region, and its gradient is also continuous. Note that as an interpolation function, a triple linear polynomial, a Lagrange's polynomial, or a spline function may be used in place of the Overhauser's polynomial.

<Third Embodiment>

Figure 18A:
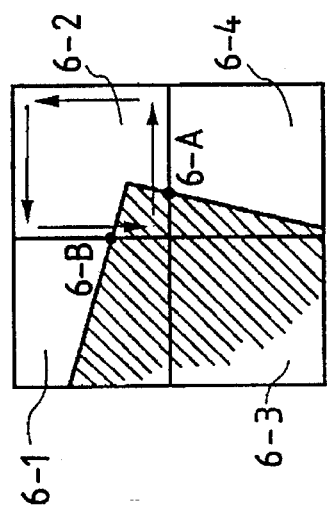
FIGS. 18A and 18B are explanatory views showing the third embodiment.

The third embodiment will be described below with reference to FIGS. 18A and 18B. In the third embodiment, faithfulness upon reproduction is improved when the contour of an image has a corner or the density changes stepwise, as shown in FIG. 18A. In this case, after brightness data of an image read by the scanner 101 are converted into density data by the B/D converter 102, the image storage 103 divides the density data into cells 6-1 to 6-4, as shown in FIG. 18A.

Then, for example, as indicated by arrows, the densities of pixels along four sides of the cell 6-2 are sequentially read out, and a flag is set for a side at which the density discontinuously changes, more particularly, the density changes by, e.g., an OD value of 0.2 or more. When sides each set with a flag number "2", and are present adjacent to each other, the directions of edges are computed at two points 6-A and 6-B of these sides. Note that the direction of the edge can be computed using, e.g., a Sobel operator, or the like.

Figure 18B:
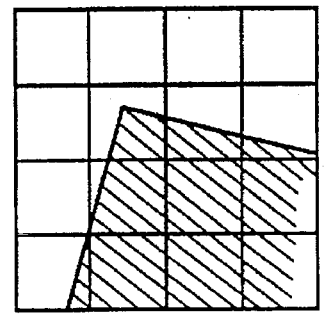

When the directions of the edges at the two points 6-A and 6-B have a difference of a predetermined angle (e.g., 60°) or more therebetween, it is determined that the corner of the contour is present in this cell 6-2, and each of this cell 6-2, the cells 6-1 and 6-4 having sides set with flags, and the cell 6-3 adjacent to the cells 6-1 and 6-4 is further finely divided into 2×2 small cells, as shown in FIG. 18B. For the finely divided small cells, rectangular solids whose heights are defined by the density level are defined, and are recorded in the same manner as in the first embodiment.

Therefore, by finely dividing the cells, and finely dividing the density level width, an image can be faithfully reproduced even when a change in density is discontinuous. In this case, cell information must be separately stored. However, when the density changes from $D_1$ to $D_2$, only two density level widths from a level near $D_1$ to a level near $D_2$ need be finely divided, thus preventing an increase in data amount.

Also, the cell may be further finely divided as needed, and the fine dividing method of the cell can also be applied to a case wherein the volume ratios Rv at lattice points are computed in the second embodiment. Even when the line width is smaller than the cell size, or the cycle of a change beyond the divided density level width in an original image is equal to or smaller than the cell size, the third embodiment can be applied.

<Fourth Embodiment>

Figure 19:
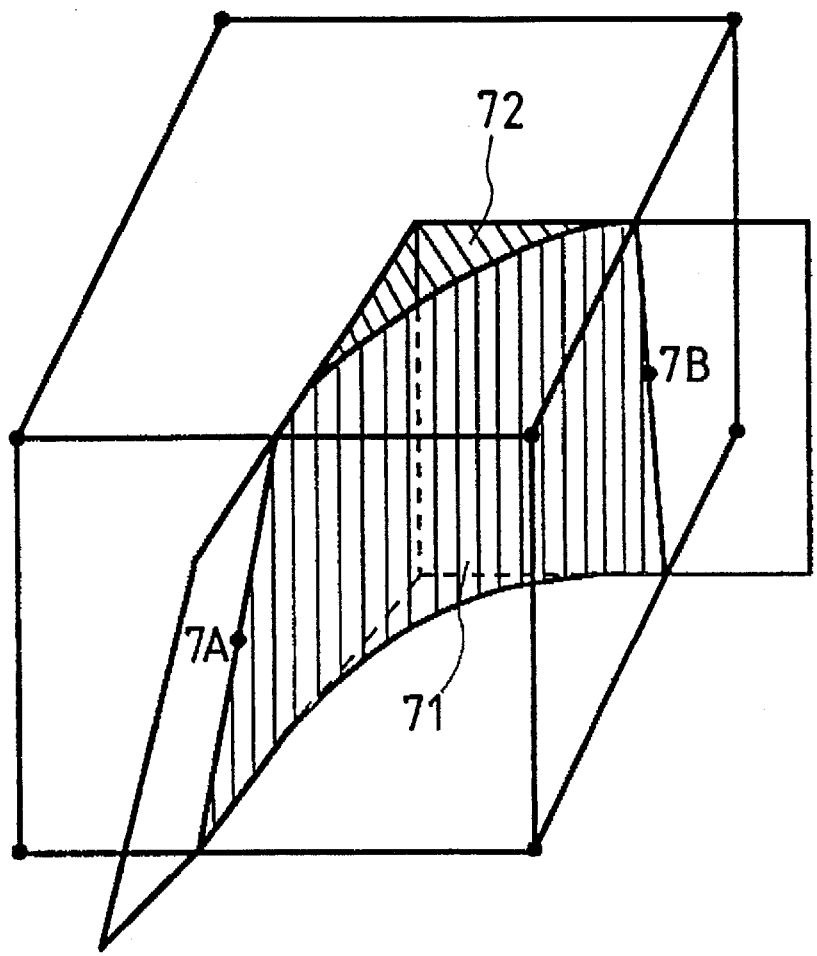
FIG. 19 is an explanatory view showing the fourth embodiment.

The fourth embodiment will be described below with reference to FIG. 19. In the fourth embodiment, when the contour of an image has a corner or the density changes stepwise, faithfulness upon reproduction can be improved without finely dividing some cells or increasing the local lattice point density.

A density distribution space is divided into rectangular solids, and Rv values are stored as in the first embodiment. Upon reproduction, an average value of Rv values at eight vertices of each rectangular solid is computed from Rv data, as shown in FIG. 19, the volume ratio distribution is computed from the average values using the above-mentioned Overhauser's polynomial, and a set of points whose volume ratios have a predetermined value (=255/2) is obtained from this distribution, thereby obtaining a density distribution curved surface 71.

Thereafter, a volume ratio Rv' below the density distribution curved surface 71 in each rectangular solid is computed, and is compared with the corresponding Rv value. When Rv'=Rv is not satisfied (the difference between Rv' and Rv is about 10% or less), and the difference between the inclinations of the density distribution curved surface 71 at points 7A and 7B on the surfaces of the rectangular solid is open (e.g., about 60° or more), a line of intersection is computed by extrapolating the two surfaces, thus obtaining a density distribution curved surface 72 having a corner or a polygonal line. When Rv values are re-computed in association with the obtained density distribution curved surface 72, since the computed values can become closer to original Rv values than the Rv' values, the faithfulness upon reproduction can be improved.

In each of the above embodiments, density data is used as gray data. However, brightness data may be used instead. When an image is reproduced by, e.g., an ink-jet printer, data can be compressed by computing the distribution of an ink printing amount or the number of dots to be printed for each pixel, and in this case, reproduced data can be directly output to the printer.

In each of the above embodiments, a monochrome image has been exemplified. However, the present invention can be applied to a color image, and in this case, the present invention can be applied to R, G, and B three brightness systems, or Y, M, and C three different density systems. Note that the recording capacity of a color image becomes three times that of a monochrome image. In this case, when brightness data and color difference information are expressed by 8 bits per pixel, the recording capacity can be reduced. As color difference information, an xy chromaticity diagram or a u'v' chromaticity diagram can be used. In order to record data by 8 bits per pixel using these chromaticity diagrams, the chromaticity diagram can be divided into, e.g., "255" regions, and in order to reproduce a more delicate chromaticity, data may be recorded by 16 bits per pixel. Furthermore, in FIG. 1, recording and reproduction are performed by the microprocessor. Instead, a special-purpose circuit such as a random logic circuit may be used.

<Fifth Embodiment>

FIGS. 20 to 24 show the fifth embodiment of the present invention.

FIG. 20 shows a state of a binary dynamic image at some typical times. Referring to FIG. 20, two circles which are separated from each other at time=0 sec approach each other while being accelerated, and are combined into a single circle after a head-on collision. After this phenomenon, the circle suddenly disappears at time=1.9 sec, and an image ends at time=2.0 sec.

Figure 21:
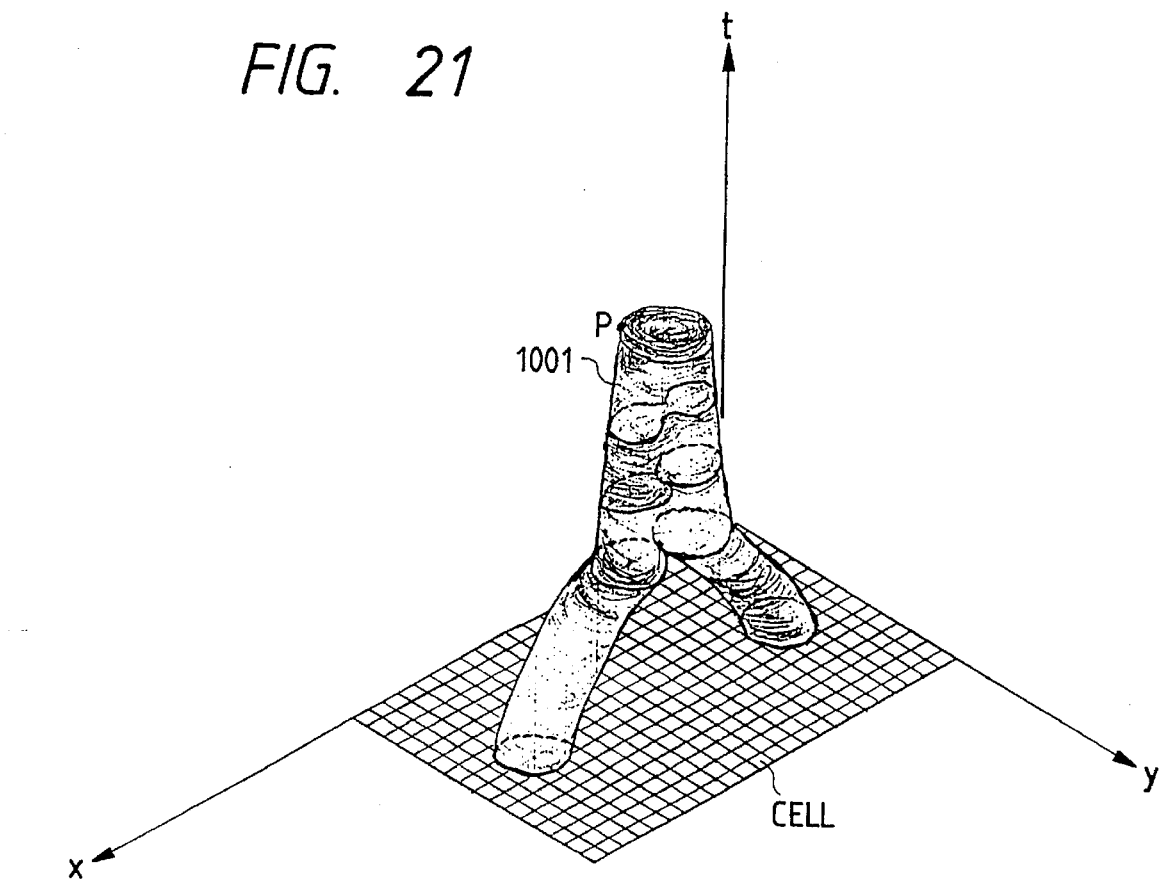
FIG. 21 is an explanatory view of the principle of an image coding method.
Figure 22:
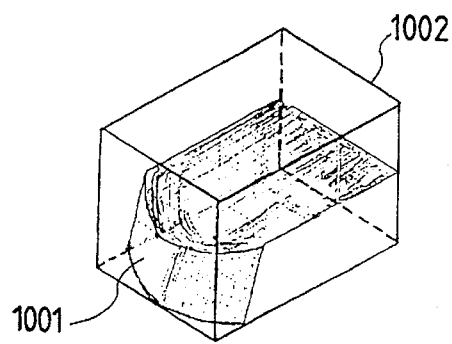
FIG. 22 is an enlarged view of a portion near a point P in FIG. 21.

FIGS. 21 and 22 show the principle of an image coding method. An x-y plane is an image plane, and a time base (t axis) perpendicular to both the x and y axes is assumed. Referring to FIG. 21, a solid defined by stacking the shapes of an original image in the xyt space has a surface 1001. Then, a pixel region (648×488 pixels) in the x-y plane is equally divided into cells each having 8×8 pixels. The number of cells is 648/8×488/8=4,941. Then, 10 rectangular solids (not shown) are stacked on each cell (in the direction of the t axis). Therefore, the number of rectangular solids is 49,410. The height of each rectangular solid corresponds to 0.2 sec (six frames).

FIG. 22 is an enlarged view of a portion near a point P in FIG. 21. FIG. 22 illustrates a rectangular solid 1002 as one of the rectangular solids.

In each rectangular solid, a ratio R of the volume inside the surface 1001 in the rectangular solid to the volume of the rectangular solid is computed and recorded. More specifically, total values of pixel data (0 or 1) in the cell corresponding to the rectangular solid are further totaled for six frames, and this value Rv is recorded or transmitted.

Figure 23:
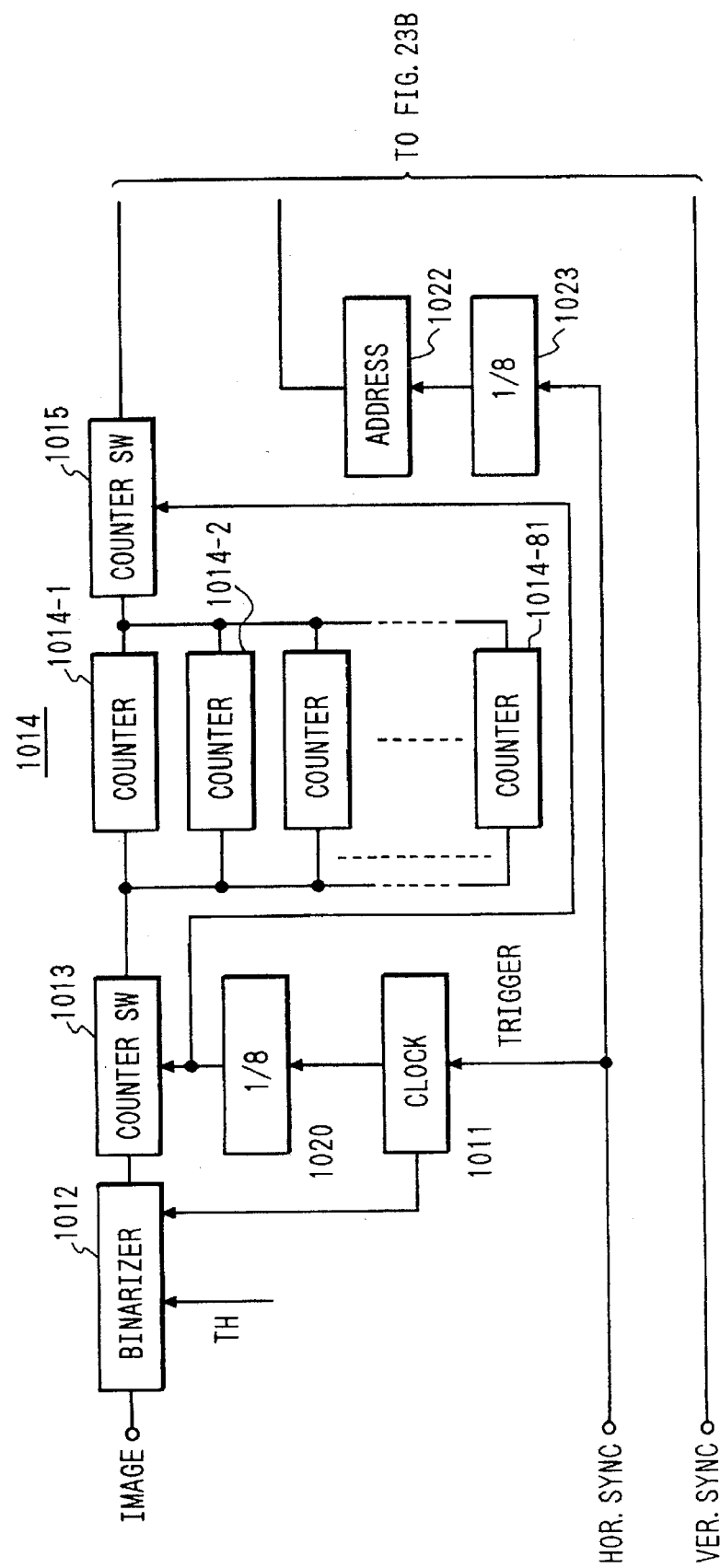
FIG. 23 is comprised of FIGS. 23A and 23B showing block diagrams of an apparatus for performing coding processing according to the fifth embodiment of the present invention.
Figure 23B:
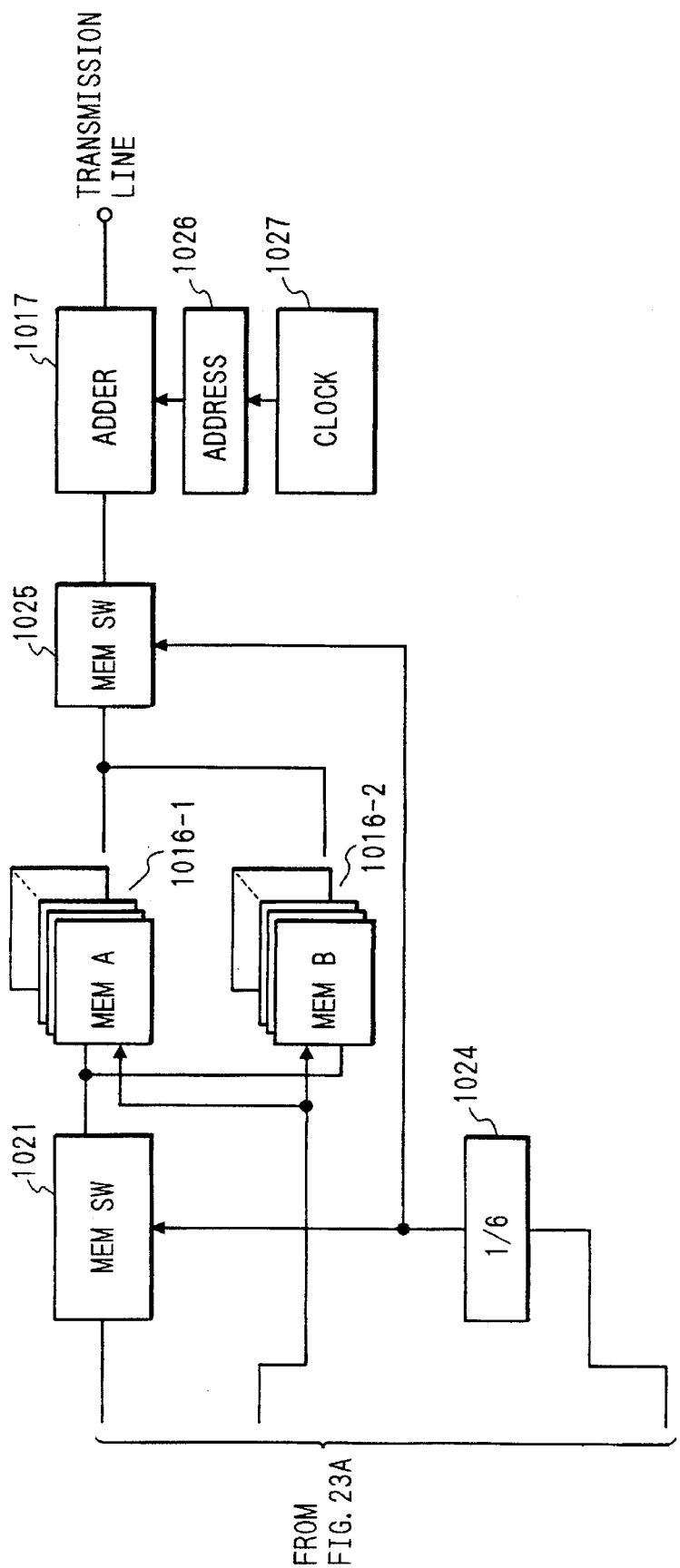

FIGS. 23A and 23B show an apparatus for executing this coding processing. A clock generator 1011 generates clock signals corresponding to pixels, and a binarizer 1012 performs binarization in synchronism with the clock signals. At this time, a predetermined proper threshold value is supplied to the binarizer 1012.

Binarized signals are supplied to counters 1014, and signals having a value=1 are counted by the counters 1014. The counters 1014 (1014-1, 1014-2, . . . , 1014-81) are arranged in correspondence with the number of cells (81 cells) in the horizontal directions. The counters are switched for every eight pixels, and the last counter 1014-81 continues to the first counter 1014-1. When this cycle is repeated eight times, 81 counter values are supplied to a memory.

In the eighth cycle, data are transferred in the order of the end of supply of data to the counters 1014. More specifically, when supply of data from the binarizer 1012 to the counter 1014-1 ends, data in the counter 1014-1 is transferred to the memory while data are transferred from the binarizer 1012 to the counter 1014-2. Memories are switched for every six frames.

This is to process and output data for the previous six frames during data input and storage processing of the current six frames.

Since values stored in the counters 1014 range from 0 to 64, the memories are designed to be able to simultaneously access 8 bits. The recording capacity is the number of cells×the number of frames per rectangular solid, i.e., 4,941×6=29,646 bytes. In this embodiment, a total of fourteen 64-Kbit RAMs, i.e., 7 RAMs×two groups, are used.

Data stored in each memory for all the frames are added in units of cells, and are transmitted onto a transmission line. For example, six sets of data at addresses 1, 1+4941, 1+4941×2, 1+4941×3, 1+4941×4, and 1+4941×5 are read out in units of bits, and are totaled by an adder 1017. This value is 9 bits/rectangular solid since it ranges from 0 to 384. In this embodiment, 9 bits×4,941=44,469 bits need only be transmitted for six frames (0.2 sec). More specifically, the transmission rate is about 220 Kbits/sec.

In order to use the transmission line more effectively, 9-bit may be divided by 255 or 127, thus reducing its size to 8 to 7 bits. A buffer and communication line coding such as a Huffman encoder may be used between the adder and the transmission line output so as to more effectively utilize the transmission line.

Figure 24:
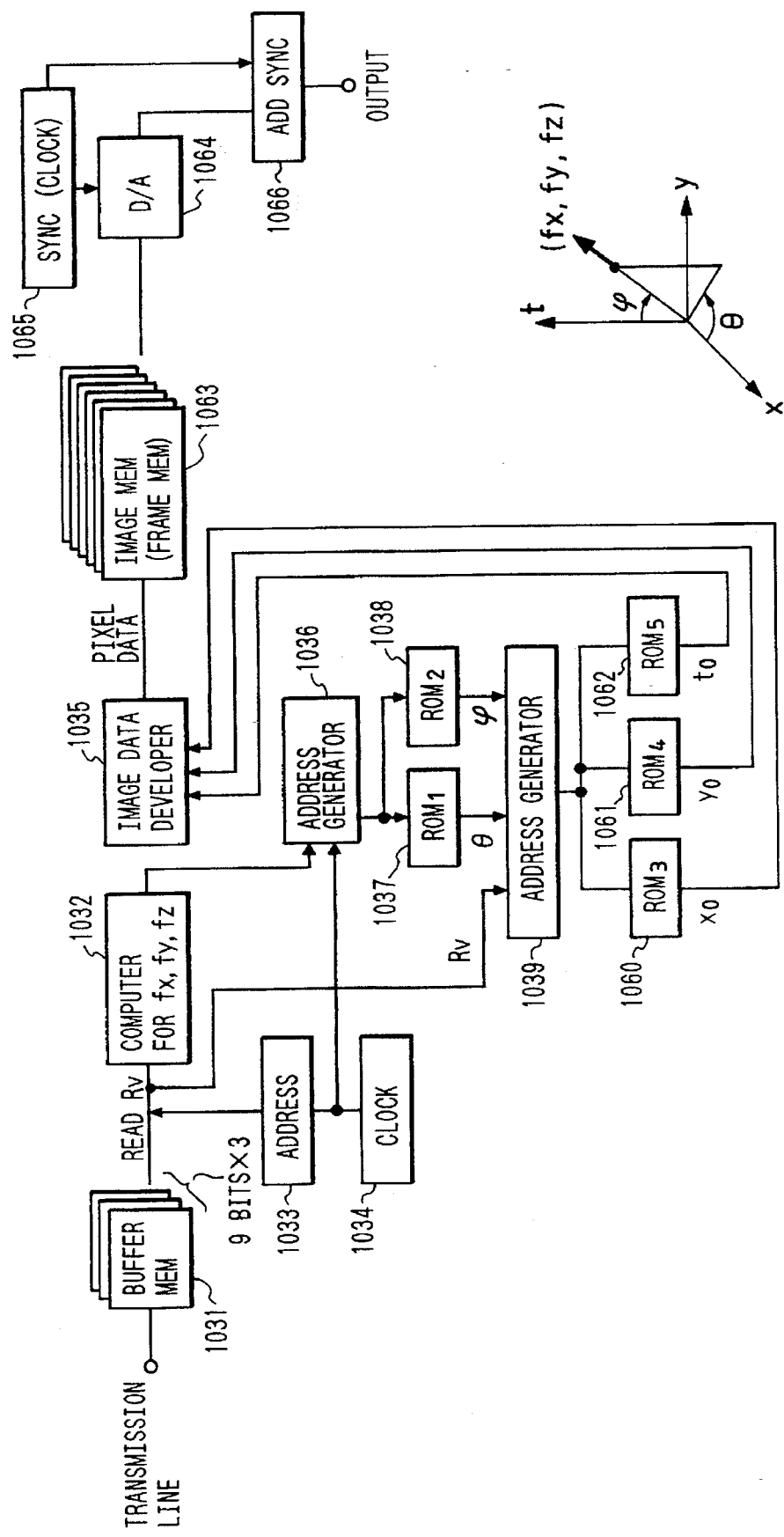
FIG. 24 is a block diagram showing an apparatus for reproducing an image in the fifth embodiment of the present invention.

FIG. 24 is a block diagram of an apparatus for reproducing an image from the transmitted Rv data. When data for the first two frame groups (one frame group=6 frames) are sent from the transmission path to a buffer memory 1031, processing is started. More specifically, the previous, current, and next frame groups are used. This reproduction apparatus has as its principal object to reproduce a three-dimensional surface (1001 in FIG. 21) of an original image. For this purpose, a normal vector to the plane is calculated. This corresponds to a block of a "computer for fx, fy, and fz", and fx, fy, and fz are computed using the following equations:

$$fx = \frac{1}{32} \sum_{\Delta j=-1}^{1} \sum_{\Delta k=-1}^{1} c(\Delta j, \Delta k)(Rv(i+1, j+\Delta j, k+\Delta k) - \quad (25)$$

-continued $$fy = \frac{1}{32} \sum_{\Delta j=-1}^{1} \sum_{\Delta k=-1}^{1} c(\Delta k, \Delta i) \left( Rv(i + \Delta i, j + 1, k + \Delta k) - Rv(i - 1, j + \Delta j, k + \Delta k) \right)$$

$$Rv(i + \Delta i, j - 1, k + \Delta k))$$

$$fz = \frac{1}{32} \sum_{\Delta i=-1}^{1} \sum_{\Delta j=-1}^{1} c(\Delta i, \Delta j a) \left( Rv(i + \Delta i, j + \Delta j, k + 1) - Rv(i + \Delta i, j + \Delta j, k - 1) \right)$$

where k in Rv(i,j,k) represents the frame group number, and i and j represent the cell positions. Also, c is a differential operator, which can be described in the simplest matrix form:

$$c = \begin{bmatrix} 0 & 0 & 0 \\ 0 & 1 & 0 \\ 0 & 0 & 0 \end{bmatrix} \quad (26)$$

However, in order to cope with a spatially sudden change in density of an image, it is desirable that the operator c be given by:

$$c = \begin{bmatrix} 1 & 2 & 1 \\ 2 & 4 & 2 \\ 1 & 2 & 1 \end{bmatrix} \quad (27)$$

The above-mentioned equations are computed by a random logic circuit (not shown) since computations can be attained by bit shift and addition/subtraction. When k indicates the first frame, i.e., when k=1, Rv(i,j,k−1)=Rv(i,j,0) is assumed to be 0 for all i's and j's. When k indicates the last frame, Rv(i,j,k+1)=0 is assumed for all i's and j's. As for i and j, when (i±1,j) or (i,j±1) indicates a non-existing cell position, processing is performed while assuming an Rv value=0.

After the normal vectors to the plane are computed, as described above, the position of the plane is uniquely computed from the Rv value of the corresponding rectangular solid. However, since this computation includes a square root and division, it is difficult to achieve this computation by a random logic circuit. Even if this computation is achieved by the random logic circuit, since the computation amount is large, reproduction of an image is delayed considerably.

Thus, in this embodiment, $\Theta$ and $\phi$ (see FIG. 24) are obtained from the values of fx, fy, and fz using a $ROM_1$ and a $ROM_2$, and a position $(x_0, y_0, t)$ of a point where the plane passes is computed from $\Theta$, $\phi$, and Rv.

An image data developer 1035 checks if each of 384 points (x,y,t) (1≦x≦8, 1≦y≦8, 1≦t≦6) satisfies:

$$(x-x_0) \cdot fx + (y-y_0) \cdot fy + (t-t_0) \cdot fz \geq 0 \quad (28)$$

If this relation is satisfied, the developer 1035 stores "1" as the value of the corresponding pixel (x,y) in a frame t. Otherwise, the developer 1035 stores "0" in an image memory. When this storage operation is completed for all rectangular solids, the stored data are converted into a TV signal by a D/A converter, and the TV signal is output together with synchronization signals.

As described above, as the principal characteristic feature of this embodiment, since the cell size ($\Delta x=\Delta y=8$ pixels) and the frame group size (6 frames) do not define the spatial temporal resolution, a contour line of an object shape in the middle of the cell size, and disappearance and appearance of an image in the middle of the frame group can be coped with.

However, since a periodic change in shape in a single cell (e.g., a line passing a cell) cannot be coped with, a method of locally decreasing the cell size can also be used in this case.

In the above description, the image transmission & reproduction method using a random logic circuit has been exemplified. However, the present invention is not limited to this, and the above-mentioned processing may be executed using a microprocessor. When reproduction of an image requires real-time processing, i.e., when a dynamic image is compressed and recorded in an external storage of a computer, and is reproduced later like in creation of a dynamic image database, the method using a microprocessor is effective.

In recent years, since particularly high-speed microprocessors have been developed, $x_0$, $y_0$, and $t_0$ may be directly computed in place of using the $ROM_1$ and $ROM_2$ shown in FIG. 24.

In the above method described in association with this embodiment, a density distribution curved surface is approximated by a plane in a single rectangular solid, and the contour of an image is also linearly approximated. In order to more faithfully reproduce a change in density of an original image, it is required to reproduce second-order differential information of the density, and to allow reproduction of the contour of an image by a curve.

For example, in addition to fx, fy, and fz described above, the following second-order differential coefficients are computed by a similar method:

$$\partial^2 Rv/\partial x^2 \equiv fxx$$

$$\partial^2 Rv/\partial y^2 \equiv fyy$$

$$\partial^2 Rv/\partial z^2 \equiv fzz$$

$$\partial^2 Rv/\partial x \partial y \equiv fxy$$

$$\partial^2 Rv/\partial y \partial z \equiv fyz$$

$$\partial^2 Rv/\partial z \partial x \equiv fzx \quad (29)$$

Then, from these first- and second-order differential coefficients, f(x,y,z)=const. {z=z(x,y)} are differentiated by x and y to compute $\partial z/\partial x$, $\partial z/\partial y$, $\partial^2 z/\partial x^2$, $\partial^2 z/\partial x \partial y$, and $\partial^2 z/\partial y^2$ at the center of a rectangular solid. More specifically, the following equations are used:

$$\partial z/\partial x = -fx/fz, \quad \partial z/\partial y = -fy/fz \quad (30)$$

$$fxx + 2fzx \frac{\partial z}{\partial x} + fz \frac{\partial^2 z}{\partial x^2} + fzz \left( \frac{\partial z}{\partial x} \right)^2 = 0$$

$$fxy + fzx \frac{\partial z}{\partial y} + fyz \frac{\partial z}{\partial x} + fz \frac{\partial^2 z}{\partial x \partial y} + fzz \frac{\partial z}{\partial x} \frac{\partial z}{\partial y} = 0$$

$$fyy + 2fyz \frac{\partial z}{\partial y} + fz \frac{\partial^2 z}{\partial y^2} + fzz \left( \frac{\partial z}{\partial y} \right)^2 = 0$$

If |fz|<<|fx| and |fz|<<|fy|, since the density curved surface crossing the rectangular solid is substantially parallel to the z axis, i.e., the density changes stepwise in the cell, the first- and second-order differential coefficients of x with respect to y and z or the first- and second-order differential coefficients of y with respect to z and x are computed in place of computing the first- and second-order differential coefficients of z with respect to x and y.

In this case, if |fy|≦|fx|, the former is selected; if |fx|≦|fy|, the latter is selected. In this manner, the first- and second-order differential coefficients at the center of the rectangular solid are obtained. From these differential coefficients, the curved surface in the rectangular solid is reproduced. Upon computation of the first- and second-order differential coefficients in this embodiment, these differential coefficients are replaced by differences.

When the obtained volume ratio below the curved surface is larger than Rv of the corresponding rectangular solid (when it is larger by 5% or more), the curved surface is slightly translated in the direction of (fx, fy, fz); when the obtained volume ratio is smaller than Rv of the corresponding rectangular solid (when it is smaller by 5% or more), the curved surface is slightly translated in the direction of (−fx,−fy,−fz), thus approaching the computed volume ratio to the actual Rv.

When the Rv value of a rectangular solid of interest is very small (e.g., $10^{-2}$ or less), it is often impossible to reproduce the curved surface with high precision by the above-mentioned method. In this case, the Rv value may be diffused before fx, fy, fz, and the like are computed. More specifically, the following equations are used:

$$Rv^{(new)}(i,j,k) = D_1\{Rv(i+1,j,k) + Rv(i-1,j,k) + \quad (31)$$
$$Rv(i,j+1,k) + Rv(i,j-1,k) +$$
$$Rv(i,j,k+1) + Rv(i,j,k-1) -$$
$$6Rv(i,j,k)\}$$

$$Rv(i,j,k) \leftarrow Rv^{(new)}(i,j,k) \text{ for all } i,j,k \quad (32)$$

where $D_1$ is the diffusion coefficient, which assumes ⅙ or less in consideration of stability.

When this processing is repeated several times, the curved surface can be reproduced with high reproducibility even for a rectangular solid having a small Rv.

As described above, according to this embodiment, even when a difference in density distribution gradient of an original image is not particularly considered, the recording information amount naturally increases for a region having a steeper change in density, and consequently, efficient preservation and faithful reproduction can be realized.

<Sixth Embodiment>

Figure 25B:
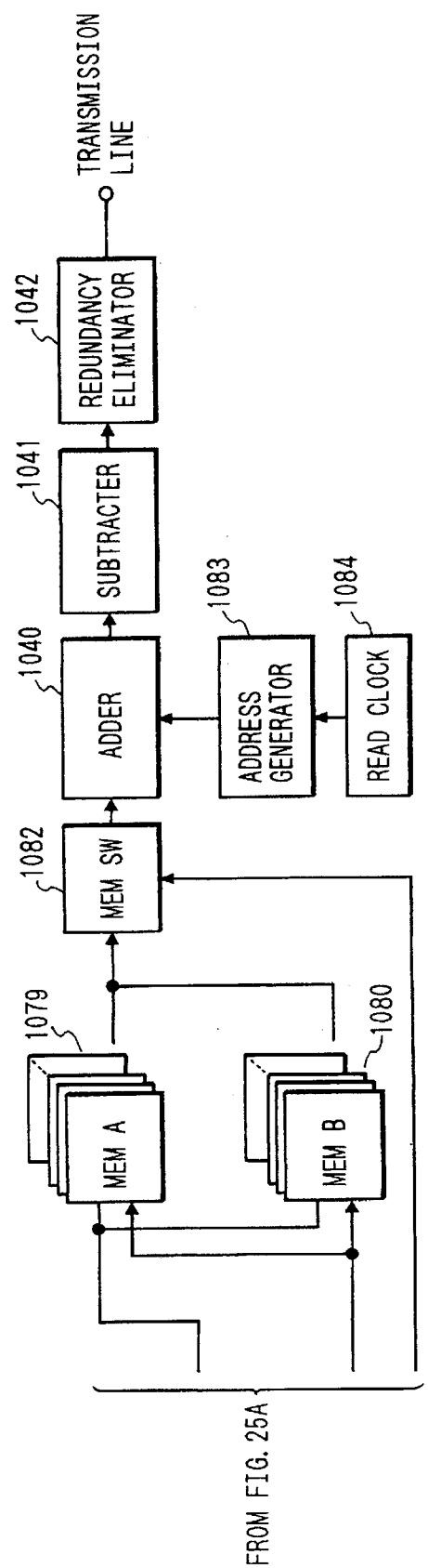
FIG. 25 is comprised of FIGS. 25A and 25B showing block diagrams of an apparatus for performing coding processing according to the sixth embodiment of the present invention.

FIGS. 25A and 25B show the sixth embodiment of the present invention. Although the number of pixels of an original image in this embodiment is the same as that in the fifth embodiment, this embodiment has been made for a density dynamic image.

In this embodiment, when the image plane is represented by x and y, time is represented by t, and the brightness is represented by D(x,y,t), the volume below a brightness distribution curved surface D(z,y,t) in a four-dimensional rectangular solid space having a volume of $\Delta x \times \Delta y \times \Delta t \times \Delta D$ in a four-dimensional Euclidean space of x, y, z, and D is recorded or transmitted.

In the same manner as the fifth embodiment, $\Delta x=8$ pixels, $\Delta y=8$ pixels, and $\Delta t=6$ frames (one frame group). Furthermore, brightness data is expressed by 8 bits ranging from 0 to 255, and $\Delta D=16$. Therefore, data 16 times those in the fifth embodiment are present in the brightness direction.

Transmission processing is basically almost the same as that in the fifth embodiment, except for the following differences.

① In place of 81 counters, 81 sets×16 adders are arranged. Each set comprises counters corresponding to 16 different brightness levels, i.e., first level to 16th level. When data are counted, if the upper 4 bits of brightness data of a pixel of interest are represented by a, and the lower 4 bits are represented by b, the first to a-th adders respectively add 16, and the (a+1)-th adder adds the value b (when a=0, the value b is added to only the first counter).

② Processing by the last adder 1040 is performed in units of density levels. Therefore, processing 16 times that in the fifth embodiment is required.

③ After the processing by the adder 1040, an operation (processing by a divider 1041) for compressing data of Rv values 0 to 6,144 into 0 to 127 is performed, thereby reducing the data amount to 7 bits/rectangular solid.

④ Immediately before data are output onto a transmission line, redundancy elimination is performed. More specifically, only $k_1$ and $k_2$ which satisfy the following relation in a certain cell (i,j) in a frame group f are output:

$$Rv(i,j,k,f)=0 \text{ for all } k \text{ such that } k>k_2$$
$$Rv(i,j,k,f)=127 \text{ for all } k \text{ such that } k<k_1 \quad (33)$$

Furthermore, known run-length compression is combined. Upon execution of this redundancy elimination, the data amount onto the transmission line is reduced from 2.77 Mbits/sec to about 0.3 Mbits/sec to about 1.2 Mbits/sec.

Furthermore, the method of this embodiment can be combined with known resolution exchange control, as a matter of course.

Reproduction of image data will be described below with reference to FIG. 26. Upon reproduction of image data, the redundancy-eliminated data are restored (1051), and the restored data are stored in buffer memories. Then, Rv data are read out from the buffer memories, and Rv* values at the vertices of each four-dimensional rectangular solid are calculated as average values of Rv data of 16 rectangular solids coupled to each vertex. More specifically, this computation can be realized by addition and right bit shift.

Using these 16 Rv* values, the Rv value in the rectangular solid can be interpolated as follows.

More specifically, if a rectangular solid region is expressed by $\{(x,y,D,f)|x_i \leq x \leq x_i+\Delta x\Delta y_j \leq y \leq y_j+\Delta y\Delta D_k \leq D \leq D_k+\Delta k\Delta f_m \leq f \leq f_m+\Delta f\}$, an Rv value at an arbitrary pixel (x,y), brightness level D, and frame f in a rectangular solid can be computed by:

$$Rv(x,y,D,f) = \sum_{\alpha=0}^{1}\sum_{\beta=0}^{1}\sum_{\gamma=0}^{1}\sum_{\delta=0}^{1} Rv^* (x_i+\alpha\Delta x,y_i+ \quad (34)$$
$$\beta\Delta y, D_k + \gamma\Delta D_i f_m + \delta\Delta f) \cdot \phi(\alpha,x_i,\Delta x,x) \cdot$$
$$\phi(\beta,y_i,\Delta y,y) \cdot \phi(\gamma,d_k,\Delta D,D) \cdot \phi(\delta,f_m,\Delta f,f)$$

In this case, we define:

$$\phi(p,q,r,s) \equiv \begin{cases} \dfrac{s-q}{r} & (\text{if } p=1) \\ \dfrac{q+r-s}{r} & (\text{if } p=0) \end{cases} \quad (35)$$

Figure 26:
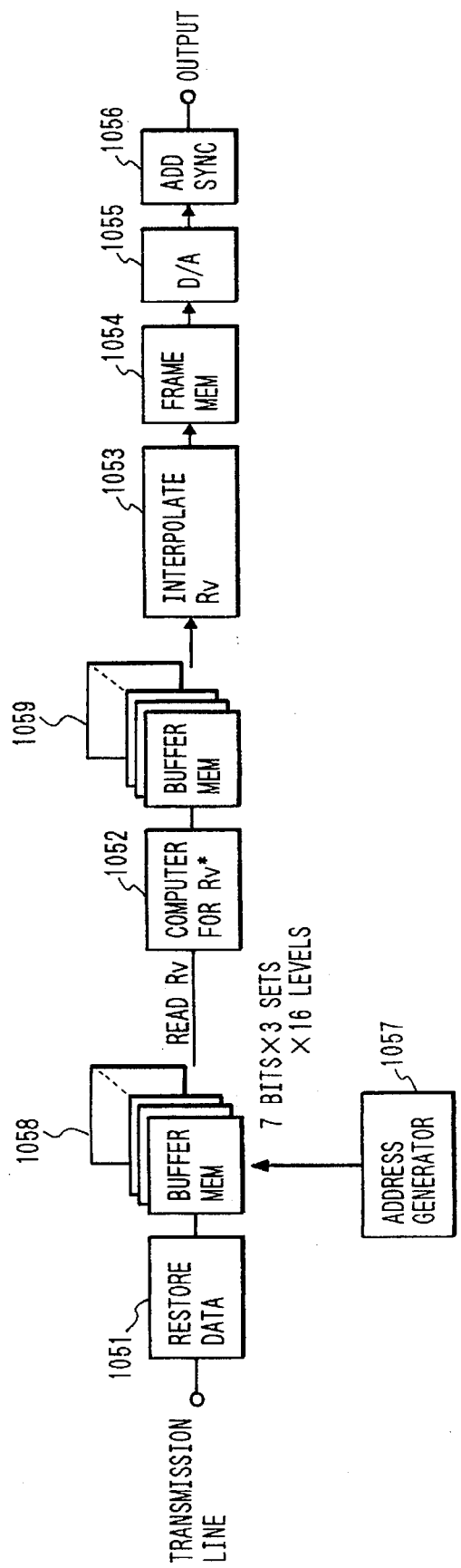
FIG. 26 is a block diagram showing an apparatus for reproducing an image in the sixth embodiment of the present invention.

This computation can also be realized by addition/subtraction/multiplication, and bit shift (1053 in FIG. 26).

Therefore, when a pixel (x,y), density level D, and frame f are given, an Rv value can be obtained. An operation for adding 1 to image data $\phi(x,y,f)$ when the Rv value is equal to or larger than a predetermined value can be performed for an image memory. The predetermined value is normally about 64.

In this embodiment as well, the cell size ($\Delta x$, $\Delta y$), the brightness level width $\Delta D$, and the frame group size (six frames) do not define any of the spatial resolution, brightness resolution, and temporal resolution as in the above embodiment.

In this embodiment, processing using a microprocessor can be performed. In this case, as the interpolation function, an Overhauser's cubic polynomial, a Lagrange's polynomial, a spline function or the like may be used in place of the above-mentioned function.

<Seventh Embodiment>

Figure 27:
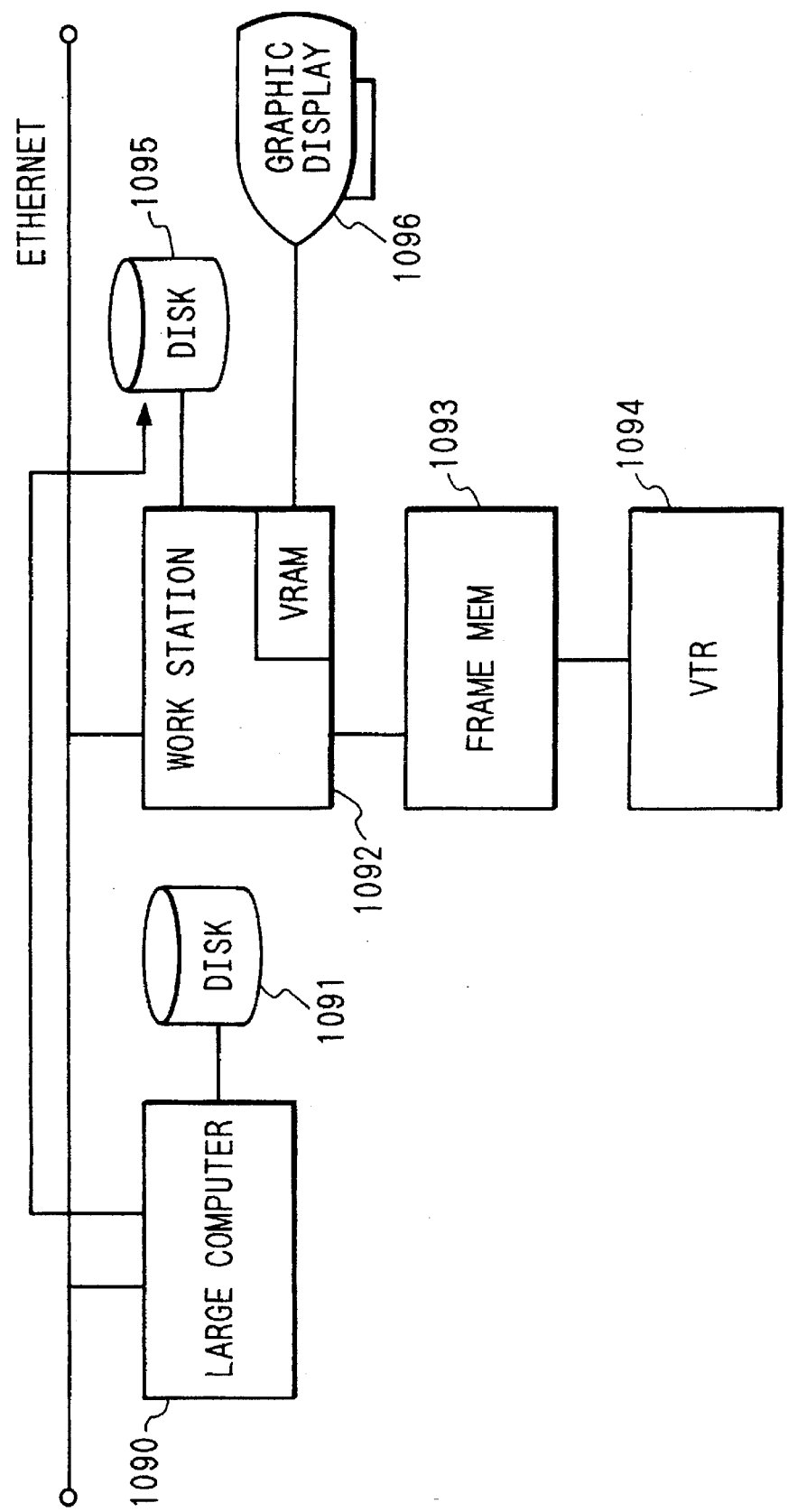
FIG. 27 is a block diagram showing the seventh embodiment of the present invention.

FIG. 27 shows the seventh embodiment of the present invention. The present invention can be applied not only to transmission/reproduction of a TV signal but also to preservation/output of computer graphics and various CAE computation results.

For example, the numeric computation results of movements of heavenly bodies by a large computer are sent to a work station via a network (Ethernet cable). In the work station, the computation results are visualized by a so-called post-processor (software; not shown). The visualized dynamic image data are stored in a disk upon execution of a program having the same function as that in the sixth embodiment.

Figure 28:
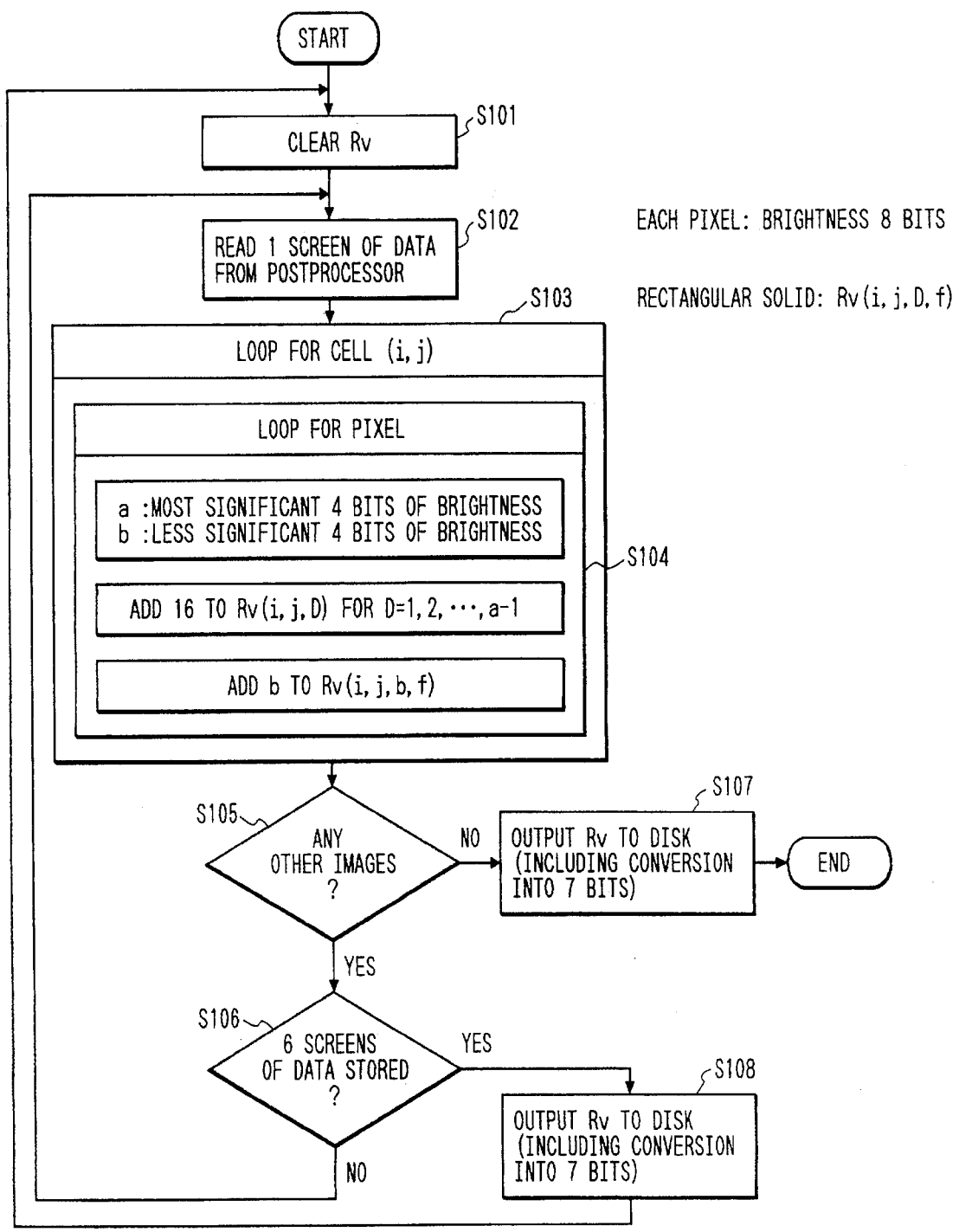
FIG. 28 is a flow chart showing an image recording program in the seventh embodiment.
Figure 29:
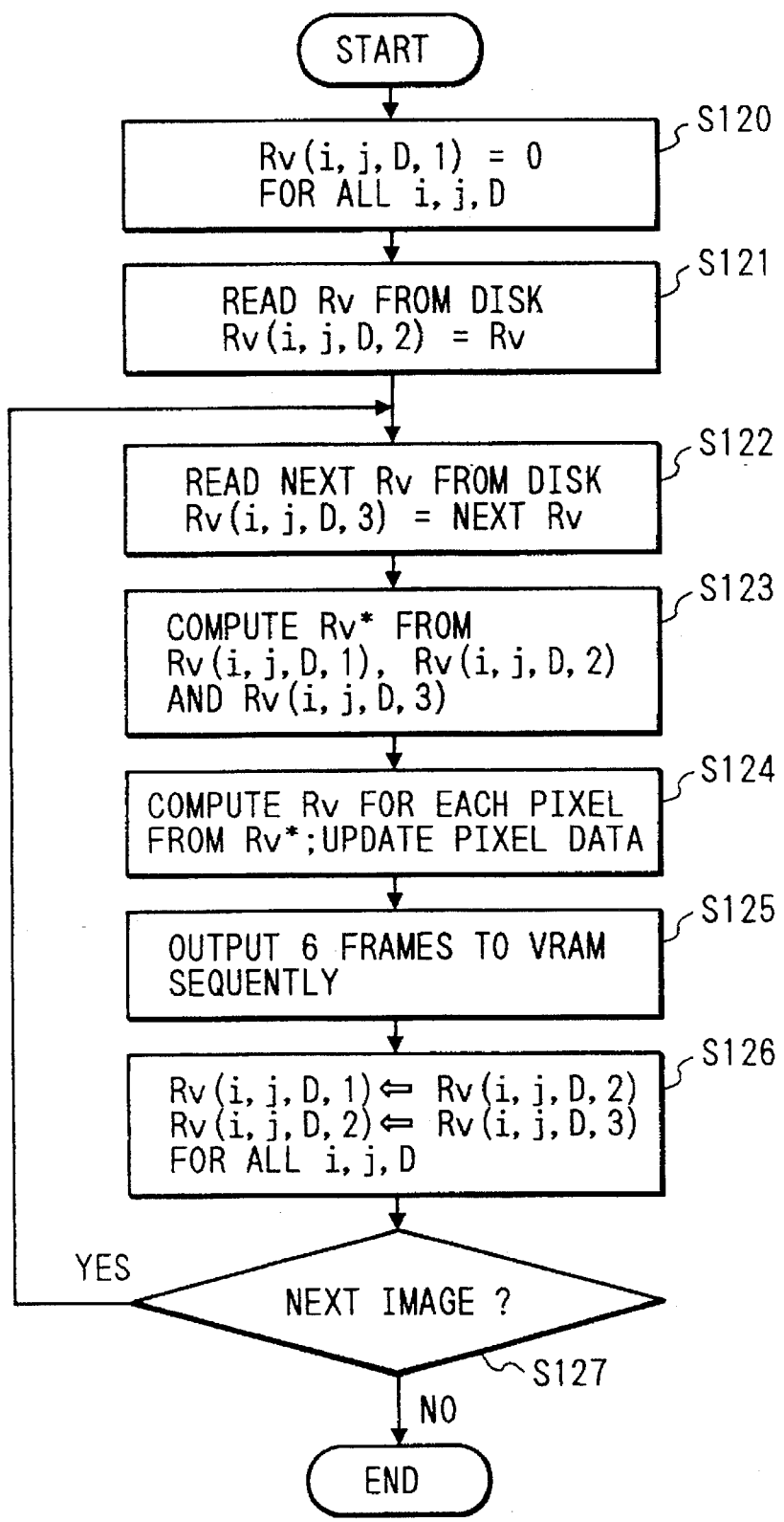
FIG. 29 is a flow chart showing an image reproduction program in the seventh embodiment.

Later, the stored data are reproduced by a computer program (see FIGS. 28 and 29) having the same function as image reproduction of the sixth embodiment, are supplied to the frame memory, and are recorded by a VTR as needed. Simultaneously with development of an image, image data can be visualized on a graphic display.

Since image recording according to the present invention can attain a high compression ratio, image data can be preserved in an external storage of a computer, as described above.

<Eighth Embodiment>

The present invention can be applied to a color image in addition to a monochrome image. In this case, R, G, and B data may be independently processed, or processing using another separation method, e.g., Y (brightness), I, and Q (color difference) signals may be executed.

As described above, according to an image processing method of the present invention, both recording of a density image at a high compression ratio, and reproduction with high faithfulness can be realized. Even when the density distribution delicately changes, or suddenly changes stepwise, an image can be reproduced with the same faithfulness.

Also, according to the present invention, recording, transmission, and reproduction of a color image can be performed with high precision.

Furthermore, the present invention can be commonly applied to a variety of media such as a TV signal, an HDTV, a personal computer, and the like, and a simple processing method for recording, transmitting, and reproducing a dynamic image can be realized. In particular, the present invention can achieve a high compression ratio and faithfulness, and can be similarly applied even to an image with quick motions, a binary image and a density image, or a monochrome image and a color image.

What is claimed is:

1. An image processing apparatus comprising:

input means for inputting multivalue image data representing an image;

deriving means for deriving, in a three-dimensional space having X-Y orthogonal coordinate system and a gray level axis perpendicular to X and Y axes separated by a plurality of rectangular solids, a volume ratio for one of the rectangular solids crossed by a curved surface representing a density distribution corresponding to the multivalue image data input by said input means; and memory means for storing the volume ratio derived by said deriving means.

2. An apparatus according to claim 1, wherein said input means comprises a scanner.

3. An apparatus according to claim 1, wherein said memory means comprises a floppy disc.

4. An apparatus according to claim 1, wherein said deriving means derives the volume ratio for all the rectangular solids in the three-dimensional space.

5. An apparatus according to claim 1, wherein if the volume ratio derived by said deriving means is small, a diffusion process is applied.

6. An apparatus according to claim 1, wherein said memory means stores the volume ratio only for the rectangular solid crossed by the curved surface.

7. An apparatus according to claim 1, further comprising generating means for reproducing a curved surface representing a density distribution on the basis of the volume ratio for the rectangular solid stored in said memory means and the volume ratio for a rectangular solid adjacent to that rectangular solid and for generating multivalue image data on the basis of the reproduced curved surface, and output means for outputting an image on the basis of the multivalue image data generated by said generating means.

8. An apparatus according to claim 7, wherein said output means comprises a printer or a display device.

9. An apparatus according to claim 1, wherein said deriving means derives the volume ratio for each of the rectangular solids under the curved surface.

10. An apparatus according to claim 1, wherein said deriving means derives the volume ratio for each of the rectangular solids above the curved surface.

11. An image processing apparatus comprising:

memory means for storing a volume ratio derived, in a three-dimensional space having X-Y orthogonal coordinate system and a gray level axis perpendicular to X and Y axes separated by a plurality of rectangular solids, for one of the rectangular solids crossed by a curved surface representing a density distribution corresponding to multivalue image data input;

generating means for reproducing a curved surface representing a density distribution on the basis of the volume ratio for the rectangular solid stored in said memory means and the volume ratio for a rectangular solid adjacent to that rectangular solid and for generating multivalue image data on the basis of the reproduced curved surface; and output means for outputting an image on the basis of the multivalue image data generated by said generating means.

12. An apparatus according to claim 11, wherein said output means comprises a printer or a display device.

13. An apparatus according to claim 11, wherein said deriving includes deriving the volume ratio for each of the rectangular solids under the curved surface.

14. An apparatus according to claim 11, wherein said deriving includes deriving the volume ratio for each of the rectangular solids above the curved surface.

15. An image processing apparatus comprising:

input means for inputting dynamic image data representing a dynamic image;

deriving means for deriving, in a three-dimensional space having X-Y orthogonal coordinate system and a time axis perpendicular to X and Y axes separated by a plurality of rectangular solids, a volume ratio for one of the rectangular solids crossed by a surface of a solid representing a set of the dynamic image data input by said input means; and memory means for storing the volume ratio derived by said deriving means.

16. An apparatus according to claim 15, wherein said memory means comprises an external storage.

17. An apparatus according to claim 15, wherein said deriving means derives the volume ratio for all the rectangular solids in the three-dimensional space.

18. An apparatus according to claim 15, wherein if the volume ratio derived by said deriving means is small, a diffusion process is applied.

19. An apparatus according to claim 15, wherein said memory means stores the volume ratio only for the rectangular solid crossed by the surface.

20. An apparatus according to claim 15, further comprising generating means for reproducing a surface of a solid representing a set of dynamic image data on the basis of the volume ratio for the rectangular solid stored in said memory means and the volume ratio for a rectangular solid adjacent to that rectangular solid and for generating dynamic image data on the basis of the reproduced solid surface, and output means for outputting a dynamic image on the basis of the dynamic image data generated by said generating means.

21. An apparatus according to claim 20, wherein said output means comprises a display device.

22. An apparatus according to claim 15, wherein said deriving means derives the volume ratio for each of the rectangular solids under the curved surface.

23. An apparatus according to claim 15, wherein said deriving means derives the volume ratio for each of the rectangular solids above the curved surface.

24. An image processing apparatus comprising:

memory means for storing a volume ratio derived, in a three-dimensional space having X-Y orthogonal coordinate system and a time axis perpendicular to X and Y axes separated by a plurality of rectangular solids, for one of the rectangular solids crossed by a surface of a solid representing a set of dynamic image data input;

generating means for reproducing a surface of a solid representing a set of dynamic image data on the basis of the volume ratio for the rectangular solid stored in said memory means and the volume ratio for a rectangular solid adjacent to that rectangular solid and for generating dynamic image data on the basis of the reproduced solid surface; and output means for outputting a dynamic image on the basis of the dynamic image data generated by said generating means.

25. An apparatus according to claim 24, wherein said output means comprises a display device.

26. An apparatus according to claim 24, wherein said deriving includes deriving the volume ratio for each of the rectangular solids under the curved surface.

27. An apparatus according to claim 24, wherein said deriving includes deriving the volume ratio for each of the rectangular solids above the curved surface.

28. An image processing method comprising the steps of:

inputting multivalue image data representing an image;

deriving, in a three-dimensional space having X-Y orthogonal coordinate system and a gray level axis perpendicular to X and Y axes separated by a plurality of rectangular solids, a volume ratio for one of the rectangular solids crossed by a curved surface representing a density distribution corresponding to the multivalue image data input in the input step; and storing the volume ratio derived in the deriving step in a memory.

29. A method according to claim 28, wherein the input step uses a scanner.

30. A method according to claim 28, wherein the memory comprises a floppy disc.

31. A method according to claim 28, wherein the deriving step derives the volume ratio for all the rectangular solids in the three-dimensional space.

32. A method according to claim 28, wherein if the volume ratio derived in the deriving step is small, a diffusion process is applied.

33. A method according to claim 28, wherein the memory stores the volume ratio only for the rectangular solid crossed by the curved surface.

34. A method according to claim 28, further comprising a generating step for reproducing a curved surface representing a density distribution on the basis of the volume ratio for the rectangular solid stored in the memory and the volume ratio for a rectangular solid adjacent to that rectangular solid and for generating multivalue image data on the basis of the reproduced curved surface, and an output step for outputting an image on the basis of the multivalue image data generated in the generating step.

35. A method according to claim 34, wherein the output step comprises a printer or a display device.

36. A method according to claim 28, wherein said deriving step includes deriving the volume ratio for each of the rectangular solids under the curved surface.

37. A method according to claim 28, wherein said deriving step includes deriving the volume ratio for each of the rectangular solids above the curved surface.

38. An image processing method using a memory for storing a volume ratio derived, in a three-dimensional space having X-Y orthogonal coordinate system and a gray level axis perpendicular to X and Y axes separated by a plurality of rectangular solids, for one of the rectangular solids crossed by a curved surface representing a density distribution corresponding to multivalue image data input, said method comprising:

a generating step for reproducing a curved surface representing a density distribution on the basis of the volume ratio for the rectangular solid stored in the memory and the volume ratio for a rectangular solid adjacent to that rectangular solid and for generating multivalue image data on the basis of the reproduced curved surface; and an output step for outputting an image on the basis of the multivalue image data generated in the generating step.

39. A method according to claim 38, wherein the output step is performed using a printer or a display device.

40. A method according to claim 38, wherein the deriving includes deriving the volume ratio for each of the rectangular solids under the curved surface.

41. A method according to claim 38, wherein the deriving includes deriving the volume ratio for each of the rectangular solids above the curved surface.

42. An image processing method comprising:

an input step for inputting dynamic image data representing a dynamic image;

a deriving step for deriving, in a three-dimensional space having X-Y orthogonal coordinate system and a time axis perpendicular to X and Y axes separated by a plurality of rectangular solids, a volume ratio for one of the rectangular solids crossed by a surface of a solid representing a set of the dynamic image data input in the input step; and a storing step for storing, in a memory, the volume ratio derived in the deriving step.

43. A method according to claim 42, wherein the memory comprises an external storage.

44. A method according to claim 42, wherein the deriving step derives the volume ratio for all the rectangular solids in the three-dimensional space.

45. A method according to claim 42, wherein if the volume ratio derived in the deriving step is small, a diffusion process is applied.

46. A method according to claim 42, wherein the memory stores the volume ratio only for the rectangular solid crossed by the surface.

47. A method according to claim 42, further comprising a generating step for reproducing a surface of a solid representing a set of dynamic image data on the basis of the volume ratio for the rectangular solid stored in the memory and the volume ratio for a rectangular solid adjacent to that rectangular solid and for generating dynamic image data on the basis of the reproduced solid surface, and an output step for outputting a dynamic image on the basis of the dynamic image data generated in the generating step.

48. A method according to claim 47, wherein the output step is performed using a display device.

49. A method according to claim 42, wherein the deriving includes deriving the volume ratio for each of the rectangular solids under the curved surface.

50. A method according to claim 42, wherein the deriving includes deriving the volume ratio for each of the rectangular solids above the curved surface.

51. An image processing method using a memory for storing a volume ratio derived, in a three-dimensional space having X-Y orthogonal coordinate system and a time axis perpendicular to X and Y axes separated by a plurality of rectangular solids, for one of the rectangular solids crossed by a surface of a solid representing a set of dynamic image data input, said method comprising:

a generating step for reproducing a surface of a solid representing a set of dynamic image data on the basis of the volume ratio for the rectangular solid stored in the memory and the volume ratio for a rectangular solid adjacent to that rectangular solid and for generating dynamic image data on the basis of the reproduced solid surface; and an output step for outputting a dynamic image on the basis of the dynamic image data generated in the generating step.

52. A method according to claim 51, wherein the output step is performed using a display device.

53. A method according to claim 51, wherein said deriving step includes deriving the volume ratio for each of the rectangular solids under the curved surface.

54. A method according to claim 51, wherein said deriving step includes deriving the volume ratio for each of the rectangular solids above the curved surface.

55. An image processing apparatus comprising:

input means for inputting dynamic multivalue image data representing a dynamic image;

deriving means for deriving, in a four-dimensional Euclidean space having X-Y orthogonal coordinate system, a time axis, and a gray level axis separated by a plurality of four-dimensional rectangular solids, a volume ratio for one of the rectangular solids crossed by a curved surface representing a density distribution corresponding to the multivalue image data input by said input means; and memory means for storing the volume ratio derived by said deriving means.

56. An apparatus according to claim 55, wherein said deriving means derives the volume ratio for each of the rectangular solids under the curved surface.

57. An apparatus according to claim 55, wherein said deriving means derives the volume ratio for each of the rectangular solids above the curved surface.

58. An apparatus according to claim 55, wherein said memory means comprises an external storage.

59. An apparatus according to claim 55, wherein said deriving means derives the volume ratio for all the rectangular solids in the three-dimensional space.

60. An apparatus according to claim 55, wherein, if the volume ratio derived by said deriving means is small, a diffusion process is applied.

61. An apparatus according to claim 55, wherein said memory means stores the volume ratio only for the rectangular solid crossed by the surface.

62. An apparatus according to claim 55, further comprising generating means for reproducing a surface of a solid representing a set of dynamic multivalue image data on the basis of the volume ratio for the rectangular solid stored in said memory means and the volume ratio for the rectangular solid adjacent to that rectangular solid and for generating dynamic image data on the basis of the reproduced solid surface, and output means for outputting a dynamic image on the basis of the dynamic image data generated by said generating means.

63. An apparatus according to claim 62, wherein said output means comprises a display device.

64. An image processing apparatus comprising:

memory means for storing a volume ratio derived, in a four-dimensional Euclidean space having X-Y orthogonal coordinate system and a time axis separated by a plurality of four-dimensional rectangular solids, for one of the rectangular solids crossed by a surface of a solid representing a set of dynamic image data input;

generating means for reproducing a surface of a solid representing a set of dynamic multivalue image data on the basis of the volume ratio for the rectangular solid stored in said memory means and the volume ratio for a rectangular solid adjacent to that rectangular solid and for generating dynamic image data on the basis of the reproduced solid surface; and output means for outputting a dynamic image on the basis of the dynamic image data generated by said generating means.

65. An apparatus according to claim 64, wherein said output means comprises a display device.

66. An image processing method comprising the steps of:

inputting dynamic multivalue image data representing a dynamic image;

deriving, in a four-dimensional Euclidean space having X-Y orthogonal coordinate system, a time axis, and a gray level axis separated by a plurality of four-dimensional rectangular solids, a volume ratio for one of the rectangular solids crossed by a curved surface representing a density distribution corresponding to the multivalue image data input in said inputting step; and storing, in a memory, the volume ratio derived in said deriving step.

67. A method according to claim 66, wherein said deriving step includes deriving the volume ratio for each of the rectangular solids under the curved surface.

68. A method according to claim 66, wherein said deriving step includes deriving the volume ratio for each of the rectangular solids above the curved surface.

69. A method according to claim 66, wherein said storing step includes Storing the volume ratio in an external storage as the memory.

70. A method according to claim 66, wherein said deriving step includes deriving the volume ratio for all the rectangular solids in the three-dimensional space.

71. A method according to claim 66, wherein, if the volume ratio derived in said deriving step is small, a diffusion process is applied.

72. A method according to claim 66, wherein, in said storing step, the volume ratio is stored only for the rectangular solid crossed by the surface.

73. A method according to claim 66, further comprising the steps (1) of reproducing a surface of a solid representing a set of dynamic multivalue image data on the basis of the volume ratio for the rectangular solid stored in said storing step and the volume ratio for the rectangular solid adjacent to that rectangular solid and generating dynamic image data on the basis of the reproduced solid surface, and (2) of outputting a dynamic image on the basis of the dynamic image data generated in said generating reproducing and generating step.

74. A method according to claim 73, wherein said outputting step is performed using a display device.

75. An image processing method comprising thte steps of:

storing, in a memory, a volume ratio derived, in a four-dimensional Euclidean space having X-Y orthogonal coordinate system and a time axis separated by a plurality of four-dimensional rectangular solids, for one of the rectangular solids crossed by a surface of a solid representing a set of dynamic image data input;

reproducing a surface of a solid representing a set of dynamic multivalue image data on the basis of the volume ratio for the rectangular solid stored in said storing step and the volume ratio for a rectangular solid adjacent to that rectangular solid and for generating dynamic image data on the basis of the reproduced solid surface; and outputting a dynamic image on the basis of the dynamic image data generated in said reproducing and generating step.

76. A method according to claim 75, wherein said outputting step is performed using a display device.

* * * * *

UNITED STATES PATENT AND TRADEMARK OFFICE
CERTIFICATE OF CORRECTION

PATENT NO. : 5,633,728

DATED : May 27, 1997

INVENTOR(S) : MASAYOSHI TACHIHARA ET AL.          Page 1 of 2

It is certified that error appears in the above-identified patent and that said Letters Patent is hereby corrected as shown below:

<u>COLUMN 2</u>
  Line 12, "utilizes" should read --utilized--;
  Line 15, "can" should read --can be--.

<u>COLUMN 6</u>
  Line 57, "storage" should read --storage unit--.

<u>COLUMN 7</u>
  Line 1, "D(p,q)," should read --D(p,q)--.

<u>COLUMN 11</u>
  Line 15, "and fx" should read --and fz--.

<u>COLUMN 17</u>
  Line 45, "Θ and φ" should read --θ and φ--;
  Line 48, "from Θ, φ" should read -- from θ, φ--.

<u>COLUMN 27</u>
  Line 5, "Storing" should read --storing--.

UNITED STATES PATENT AND TRADEMARK OFFICE
CERTIFICATE OF CORRECTION

PATENT NO. : 5,633,728

DATED : May 27, 1997

INVENTOR(S) : MASAYOSHI TACHIHARA ET AL.

It is certified that error appears in the above-identified patent and that said Letters Patent is hereby corrected as shown below:

<u>COLUMN 28</u>
Line 3, "thte" should read --the--.

Signed and Sealed this

Second Day of December, 1997

BRUCE LEHMAN

*Attest:*

*Attesting Officer*     *Commissioner of Patents and Trademarks*